(12) United States Patent
Kalantar et al.

(10) Patent No.: US 6,174,064 B1
(45) Date of Patent: Jan. 16, 2001

(54) LIGHT GUIDE PANEL AND PLANE ILLUMINATOR APPARATUS

(75) Inventors: Kalil Kalantar; Shingo Matsumoto; Tomohisa Onishi, all of Tama (JP)

(73) Assignee: Nippon Denyo Company, Tokyo (JP)

( * ) Notice: Under 35 U.S.C. 154(b), the term of this patent shall be extended for 0 days.

(21) Appl. No.: 09/189,303

(22) Filed: Nov. 10, 1998

(30) Foreign Application Priority Data

Dec. 29, 1997 (JP) .................................................. 9-367878
May 27, 1998 (JP) .................................................. 10-146354

(51) Int. Cl.$^7$ ..................................................... F21V 8/00
(52) U.S. Cl. ................................. lp;1p362/31; 262/560; 262/26

(58) Field of Search .................................. 362/31, 26, 27, 362/23, 559, 560, 22, 561, 812; 359/530, 546, 850

(56) References Cited

U.S. PATENT DOCUMENTS 3,043,947 * 7/1962 Albinger, Jr. ........................... 362/31
5,349,503 * 9/1994 Blonder et al. ......................... 362/31

* cited by examiner

Primary Examiner—Sandra O'Shea
Assistant Examiner—Ismael Negron
(74) Attorney, Agent, or Firm—Workman, Nydegger & Seeley

(57) ABSTRACT

A light guide panel includes a front surface portion, a back surface portion located on the opposite side of the front surface portion, and an incidence end surface portion located on one side of the front and the back surface portions. The incidence end surface portion is configured for introducing light from a light source into the light guide panel. A plurality of optical elements are randomly disposed on the front and/or back surface portions. The optical elements typically have a maximum diameter in a range from 10 μm to 150 μm and are configured for emanating light propagating in the light guide panel from the front surface portion and/or back surface portion to the outside of the light guide panel.

32 Claims, 28 Drawing Sheets

LIGHT GUIDE PANEL AND PLANE ILLUMINATOR APPARATUS

This application is based on Patent Application Nos. 367,878/1997 filed on Dec. 29, 1997 in Japan and 146,354/1998 filed on May 27, 1998 in Japan, the content of which is incorporated hereinto by reference.

BACKGROUND OF THE INVENTION

1. Field of the Invention

The present invention relates to a light guide panel in which light introduced from a side end surface emanates from a front or back surface, the light guide panel being used in a plane illuminator apparatus, and more specifically to plane illuminator apparatus for use in illumination of a display using a transmission or a reflection type liquid crystal device.

2. Description of the Prior Art

A plane illuminator apparatus used as the so-called backlight for a liquid crystal is adapted such that light from a light source is guided into a transparent light guide panel from a side end surface of the same. The light uniformly emanates from a front or back entire surface area of the light guide panel by making use of the reflection of the light in the light guide panel. Considering the characteristics of a liquid crystal display for which a plane illuminator apparatus is used, it is particularly important that the plane illuminator apparatus emit light uniformly over the whole of the apparatus. It is also preferred that the apparatus be thin plate-shaped as a whole and that power consumption of a corresponding light source be reduced to the utmost.

To achieve such requirements, a conventional plane illuminator apparatus enjoys a structure in which there are superimposed two prism sheets one on the other. A light reflection sheet is provided on a back surface side of a light guide panel and a plurality of isosceles triangle pillar-like shaped prisms are parallely arranged on the front surface side of the light guide panel such that these prisms cross perpendicularly to each other in their longitudinal directions. More specifically, light emanating from the back surface side of the light guide panel is forced to again impinge the light guide panel with the aid of the light reflection sheet and light emanating from the surface of the light guide panel is converged with a pair of the prism sheets to ensure highly bright illumination light.

There is further known a light guide panel in which light incident on the light guide panel is intended to be uniformly distributed. For these innumerable dots with the size from several hundred micrometers to several millimeters, white colored ink is printed on the back surface of the light guide panel. For preventing these dots from obstructing the view, a light diffusion sheet is interposed between the light guide panel and the prism sheet. The light diffusion sheet disperses light emanating from the front surface of the light guide panel.

The light emanating from the front surface of the light guide panel suffers ordinarily from uncontrollable directivity which is dependent upon the physical properties of the light guide panel. A direction where maximum brightness is obtained and a desired direction of a view is obtained are practically not coincident with each other. Therefore, simple superposition of the prism sheet on the front surface of the light guide panel causes the light from the light guide panel to emanate only from one slope side of the prism, so that light intensity with uniform distribution is not obtained.

Prior art in which dots formed with white colored ink are printed on the back surface of the light guide panel, and light propagating in the light guide panel is diffused, suffers from occurrence of absorption loss of the light. Further, in order to prevent these dots from becoming conspicuous, it is necessary to jointly use the light diffusion sheet so that most of the light passing through the light diffusion sheet becomes diffusion light to result in sharp reduction of brightness. As a result, a bright light source with a greater intensity of radiation must be used. It is further quite impossible to control the propagation direction of the light.

The Conventional prism sheet is capable of converging the diffusion light from the light guide panel. Light emanating from the light guide panel, however, contains components which are not perpendicular to the surface of the light guide panel and are generally inclined in the direction where they are separated from the light source. Thus, the Conventional prism sheet cannot deflect the light emanating from the front surface of the light guide panel in a desired direction, i.e., perpendicularly to the front surface of the light guide panel.

The Conventional plane illuminator apparatus uses two prism sheets superimposed on the light guide panel in addition to the diffusion sheet. This large number of parts makes it impossible to reduce the thickness thereof as a whole. Severe optical loss happens owing to the diffusion sheet and owing to reflection on an interface between the two prism sheets. As such, is necessary to use a bright light source with a greater intensity of radiation. This causes a factor of preventing the whole of the plane illuminator apparatus from being made compact and the apparatus from being made low power consumption.

A reflection type liquid crystal display has higher image contrast than a transmission type liquid crystal display to ensure an excellent quality image, but it requires illumination by outdoor daylight and hence it can not be used at night or in a room and the like without any illumination. Accordingly, a transmission type liquid display in which a backlight source can be incorporated is solely used as a display mounted on a portable small-sized computer.

There are situations where effective illumination is required for a limited area without use of a large-scaled illuminator instrument without limiting to such a reflection type liquid crystal display.

For such a requirement, a method is used conventionally in which an object to be observed is directly illuminated with an LED or a midget lamp.

Recently, a small-sized illuminator apparatus has been designed for reflection type liquid crystal display comparable with the backlight source for use in a transmission type liquid crystal display such that a reflection type liquid crystal display excellent in view of image quality is usable at night or in a room without any illumination.

However, the conventional illuminator apparatus has the problem that it is difficult for the apparatus to achieve uniform illumination because the apparatus illuminates an object to be observed from the side thereof or obliquely from the front with light from an LED or a midget lamp. It is therefore difficult to apply the apparatus to a reflection type liquid crystal display.

Further, there is a possibility that when an illumination light source is located between an observation point and an object to be observed, the illumination light source interferes with a liquid crystal panel and hence the whole of the object fails to be observed.

SUMMARY OF THE INVENTION

It is a first object of the present invention to provide a light guide panel which is capable of emitting high brightness light with reduced loss and with uniform distribution.

It is a second object of the present invention to provide a plane illuminator apparatus in which not only optical loss is reduced but also the number of parts is reduced. The plane illuminator apparatus is compact and has low power consumption.

In a first aspect of the present invention a light guide panel comprises a front surface portion, a back surface portion located on the opposite side of the front surface portion, and an incidence end surface portion located on one end sides of the front and back surface portions for introducing light from a light source. The light incident from the incidence end surface portion is forced to emanate from at least one of the front and back surface portions. A plurality of optical elements are provided on at least one of the front and back surface portions in a random manner. The optical elements emanate light propagating in the light guide panel from at least one of the front and back surface portions to the outside of the light guide panel.

In accordance with the present invention, light from a light source incident from the incidence end surface portion is changed in its progress direction with the optical element provided on at least one of the front and back surface portions of the light guide panel. The light is finally emanated from the front surface portion and/or the back surface portion of the light guide panel to the outside of the light guide panel.

In the light guide panel according to the first aspect of the present invention, the size of the optical element ranges preferably from 10 μm to 150 μm.

The optical element may have an inclined plane where an interval between the inclined plane and the front surface portion and/or the back surface portion, on which the optical element is provided, is increased as it goes to the incidence end surface portion side. Herein, an angle γ formed between the inclination plane and the front surface portion and/or the back surface portion preferably satisfies:

$$\{(2\pi/9)-(\beta/2)\} \leq \gamma \leq \{(11\pi/36)-(\beta/2)\},$$

where $\beta=\sin^{-1}(1/n)$, n is a refractive index of a material constructing the light guide panel, π is the circular constant of a circle to its diameter.

Otherwise, the optical element may include part of a convex spherical surface having a arc surface of a predetermined radius of curvature in a plane perpendicular to the front surface portion and/or the back surface portion, on which the optical element is provided, and the incidence end surface portion. Herein, a relationship between the radius R of curvature of the arc surface and an amount h of protrusion of the arc surface from the front surface portion and/or the back surface portion on which the optical element is provided satisfies:

$$h=R(1-\cos \epsilon)$$

and $$\{(2\pi/9)-(\beta/2)\} \leq \epsilon \leq \{(11\pi/36)-(\beta/2)\}$$

where R=r/sin ε, and r is the radius of curvature of the optical element.

The optical element may be adapted such that the contour configuration projected perpendicularly onto the front surface portion and/or the back surface portion, on which the optical element is provided, comprises a triangle with one side thereof set substantially in parallel to the incidence end surface portion. In this case, the optical element may be a triangular pyramid including a pyramid surface inclined with respect to the front surface portion and/or the back surface portion on which the optical element is provided. The triangular pyramid includes the one side and a pair of pyramid surfaces substantially perpendicular to the front surface portion and/or the back surface portion on which the optical element is provided. Alternatively, the optical element may be configured into a triangular pillar.

The optical element may be provided exclusively on only one of the front and back surface portions, and a light deflection means may be provided on the other of the surface portions for deflecting the light in a predetermined direction. Herein, the light deflection means may be one having a concave or convex surface of the predetermined radius of curvature extending perpendicularly to the incidence end surface portion and alternately arranged perpendicularly to the extension direction. Alternatively, the light deflection means may be one having a plurality of triangular pillar-like shaped prism surfaces arranged perpendicularly to the extension direction.

A second aspect of the present invention is a light guide panel which includes a front surface portion, a back surface portion located on the opposite side of the front surface portion, and an incidence end surface portion located on one end sides of these front and back surface portions for introducing light from a light source. The light guide panel is disposed between an observation position and an object to be observed. A plurality of optical elements are provided on at least one of the front and back surface portions randomly for emanating light propagating in the light guide panel from the back surface portion to the outside of the light guide panel. The total area of these plurality of the optical elements is set within a range of 1 to 20% of an area of the front surface portion or the back surface portion.

In accordance with the present invention, illumination light from a light source impinges into the light guide panel from the incidence end surface portion of the light guide panel and propagates with total reflect in the light guide panel. Part of the light emanates from the back surface portion to the outside of the light guide panel by the optical element and illuminates an object to be illuminated. That is, a luminous flux having a cross sectional configuration substantially corresponding to that of the back surface portion of the light guide panel illuminates the object. The object illuminated in such a manner is observed from an observation point through the light guide panel.

In the light guide panel according to the second aspect of the present invention, the size of the optical element preferably ranges from 10 μm to 150 μm.

The optical element may be part of a convex spherical surface having a arc surface having the predetermined radius of curvature in a plane perpendicular to the front surface portion and/or the back surface portion, on which the optical element is provided, and the incidence end surface portion. Herein, when the refractive index of a material constructing the light guide panel is represented by n, the circular constant of a circle to its diameter is represented by π, the radius of curvature of the optical element is represented by r, a relationship between the radius R of curvature of the arc surface and the amount h of protrusion of the arc surface from the front surface portion and/or the back surface portion on which the optical element is provided satisfies:

$$h=R(1-\cos \epsilon)$$

and $$\{(2\pi/9)-(\beta/2)\} \leq \epsilon \leq \{(11\pi/36)-(\beta/2)\},$$

where $\beta=\sin^{-1}(1/n)$, R=r/sin ε.

The optical element may be adapted such that a contour configuration thereof projected perpendicularly to the front surface portion and/or the back surface portion on which the optical element is provided is a triangle with its side being substantially parallel to the incidence end surface portion. Herein, the optical element is preferably a triangular pyramid having a pyramid surface inclined to the front surface portion and/or the back surface portion on which the optical element is provided. The triangular pyramid includes the one side and a pair of pyramid surfaces substantially perpendicular to the front surface portion and/or the back surface portion.

A third aspect of the present invention is a plane illuminator apparatus wherein it includes a light guide panel including a front surface portion, a back surface portion located on the opposite side of the front surface portion, and an incidence end surface portion located on one end sides of these front and back surface portions. A light source projects light into the light guide panel from the incidence end surface portion of the light guide panel. A light reflection sheet covers the light guide panel excepting the front surface portion and the incidence end surface portion of the same. A plurality of optical elements are provided randomly on at least one of the front and back surface portions for emanating light propagating in the light guide panel from at least one of the front and back surface portions to the outside of the light guide panel.

In accordance with the present invention, light incident into the light guide panel from the incidence end surface portion is changed in its progress direction with an optical element provided on at least one of the front and back surface portions of the light guide panel. The light is emanated from the front surface portion and/or the back surface portion of the light guide panel to the outside of the light guide panel. The light emanating from the light guide panel excepting the front surface and the incidence end surface is again introduced into the light guide panel with the light reflection sheet. The light is finally emanated from the front surface portion of the light guide panel.

In the plane illuminator apparatus according to the third aspect of the present invention, the optical elements may be provided exclusively on only one of the front and back surface portions, and light deflection means may further be provided on the other of the front and back surface portions for deflecting the light in a predetermined direction.

The optical element in the present invention is desirably set such that a rate of the optical element occupied by the front surface portion and/or the back surface portion per unit area on which the optical element is provided is larger as it goes away from the incidence end surface portion. A prismatic-shaped surface of the light deflection plate alternately has a first inclined surface where an interval with a plane part is increased as it goes to an incidence end surface portion side. A second inclined surface is disposed next to the first inclination surface. An angle between the plane part and the first inclined surface is effectively smaller than an angle between the plane part and the second inclined surface.

In accordance with the light guide panel and the plane illuminator apparatus of the present invention, there is provided the plurality of the optical elements on at least one of the front and back surface portions of the light guide panel for emanating light incident from the incidence end surface portion of the light guide panel from at least one of the front and back surface portions. The light from the light source incident into the light guide panel from the incidence end surface portion is changed in its progress direction with the optical elements provided on the light guide panel. The light can be finally emanated from at least one of the front and back surface portions to the outside of the light guide panel.

Light deflection means for deflecting the light in a predetermined direction is provided on a side of the front and back surface portions of the light guide panel where no optical element is provided. It is thus possible to deflect light emanating from the front surface portion of the light guide panel to the outside of the same in a predetermined direction. It is also possible to deflect light emanating from the back surface portion of the light guide panel to the outside of the light guide panel or deflect light incident into the light guide panel from the back surface portion with the aid of the light reflection sheet in a predetermined direction.

When the light deflection means is provided in a united manner on a side of the light guide panel where the optical elements on the front surface portion and the back surface portion of the light guide panel are not provided, it is possible to eliminate the prism sheet used conventionally. As a result, a further thinner plane illuminator apparatus with reduced optical loss and power consumption is obtained.

The above and other objects, effects, features and advantages of the present invention will become more apparent from the following description of embodiments thereof taken in conjunction with the accompanying drawings.

DETAILED DESCRIPTION OF THE PREFERRED EMBODIMENT

In what follows, preferred embodiments of the present invention will be described in detail with reference to FIGS. 1 to 29. The present invention is not limited to these embodiments and is applicable to techniques in other fields where the preferred embodiments are combined and/or the same subjects as those of the present application are included.

FIGS. 1 to 15 illustrate embodiments of a light guide panel where the present invention is applied to illuminate a reflection type liquid crystal display. The Figures also disclose embodiments of a plane illuminator apparatus using the light guide panel.

Figure 1:
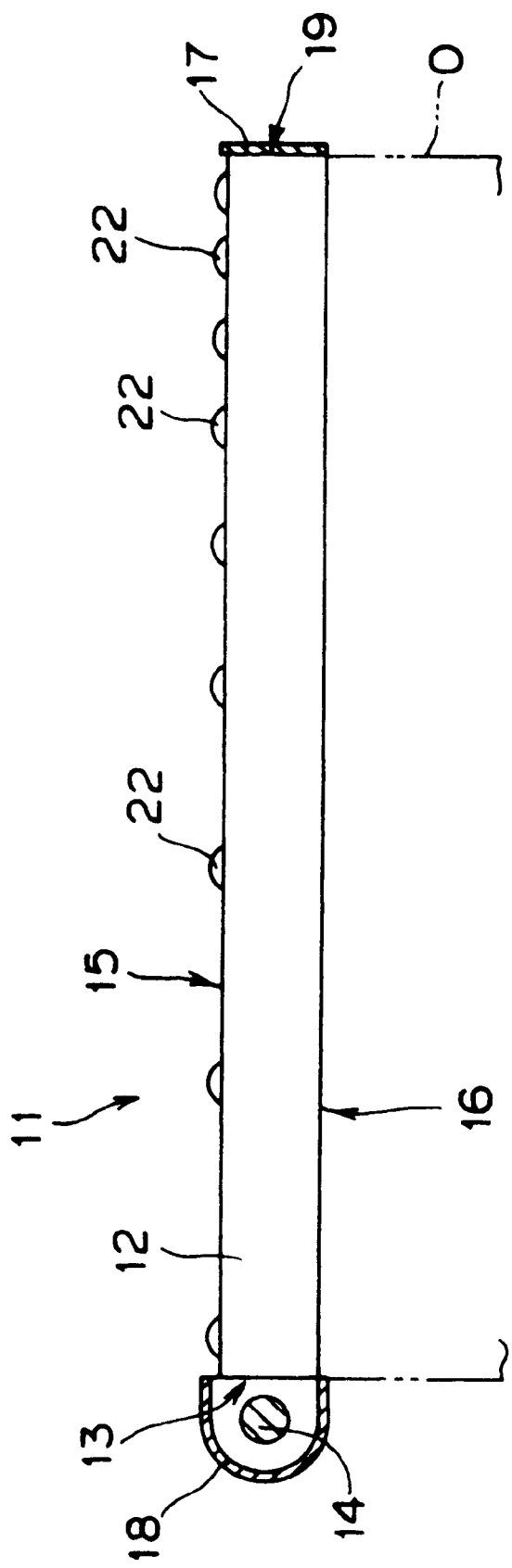
FIG. 1 is a cross section illustrating a schematic structure of an embodiment of a plane illuminator apparatus according to the present invention.
Figure 2:
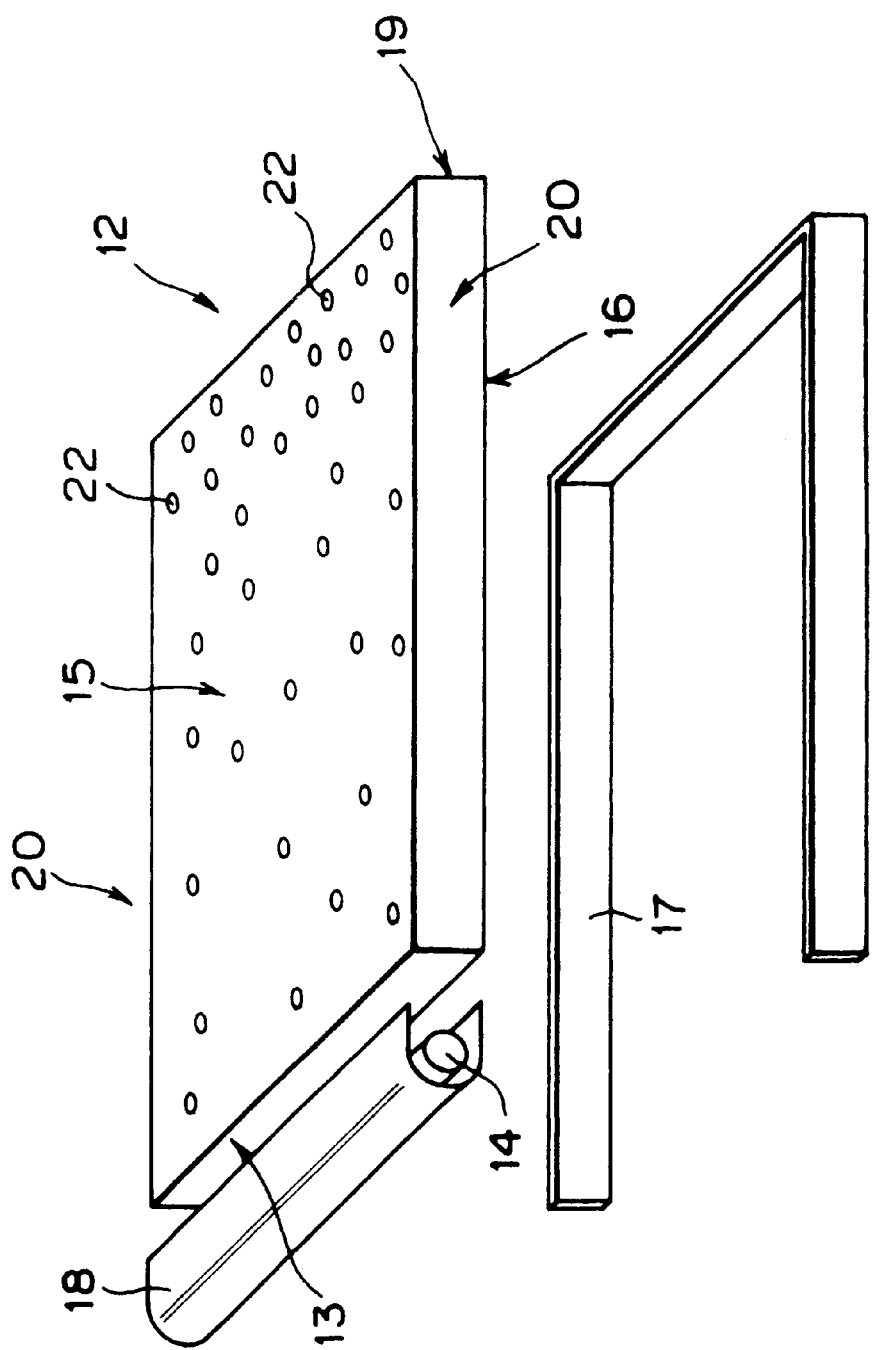
FIG. 2 is a decomposed perspective view illustrating the embodiment of FIG. 1.

Illustrated in FIG. 1 is a cross sectional structure of a plane illuminator apparatus 11 according to this embodiment. Illustrated in FIG. 2 is an external appearance of the plane illuminator apparatus 11 in a decomposed state. The plane illuminator apparatus 11 in this embodiment is disposed so as to be superimposed on an object O to be observed, such as a reflection type liquid crystal display. The object O is observed through the plane illuminator apparatus 11 from an observation position (above the plane illuminator apparatus 11 in FIG. 1) opposing to the object O.

The plane illuminator apparatus 11 includes a rectangular plate-shaped light guide panel 12, a linear light source 14 disposed along an incidence end surface portion 13 of the light guide panel 12, and a light reflection sheet 17. The light reflection sheet 17 covers a portion of the light guide panel 12 excepting the incidence end surface portion 13, a front surface portion 15, and a back surface portion 16. It is herein noted that the light source 14 constituted with a fluorescent lamp is surrounded with a reflector 18 having a reflection surface, a cross section of which is parabolic-shaped. Reflected light from the reflector 18 impinges into the light guide panel 12 from the incidence end surface portion 13 of the light guide panel 12 substantially parallel to the back surface portion 16.

In this embodiment, although there was used the light source 14 using a fluorescent lamp as a light source, the light source may be constructed with an LED array arranged on a straight line.

In this embodiment, the light guide panel 12 is formed with a transparent acrylic resin (PMMA) and polycarbonate (PC) and the like. The light guide panel 12 includes an incidence end surface portion 13 for introducing light from the light source 14, a reflection end surface portion 19 located on the opposite side of the incidence end surface portion 13, and a pair of side end surface portions 20 connected with both side ends of the incidence end surface portion 13 and the reflection end surface portion 19. The front surface portion 15 is surrounded by the incidence end surface portion 13, the reflection end surface portion 19, and the pair of the side end surface portions 20. The front surface portion 15 is directed to an observation position side. The back surface portion 16 is located on the opposite side of the front surface portion 15 and is positioned just above an observation area of the object O.

Figure 3:
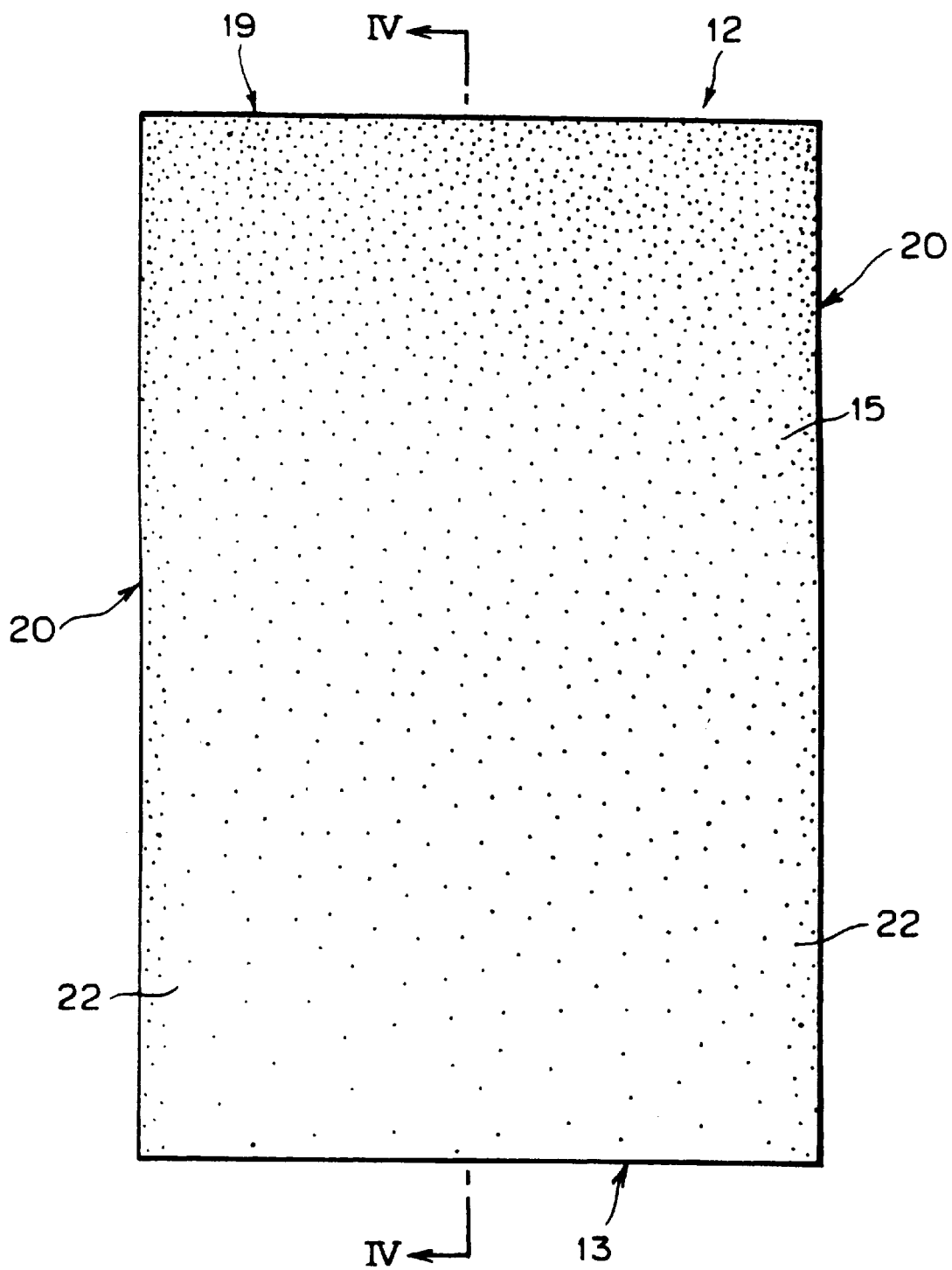
FIG. 3 is a plan view illustrating a front surface portion of a light guide panel in the embodiment of FIG. 1.
Figure 4:
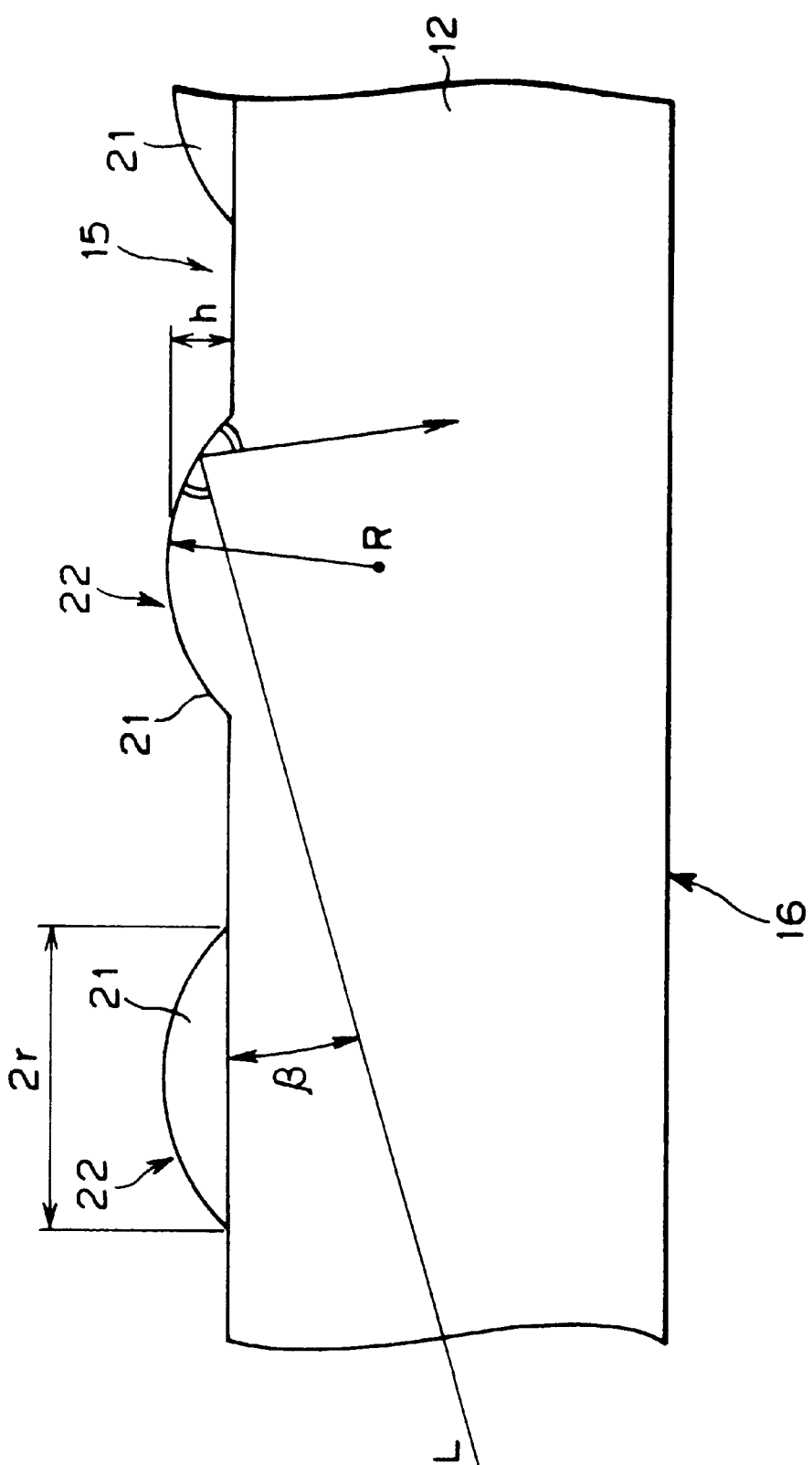
FIG. 4 is an extracted, enlarged cross section taken along an arrow IV—IV in FIG. 3.
Figure 5:
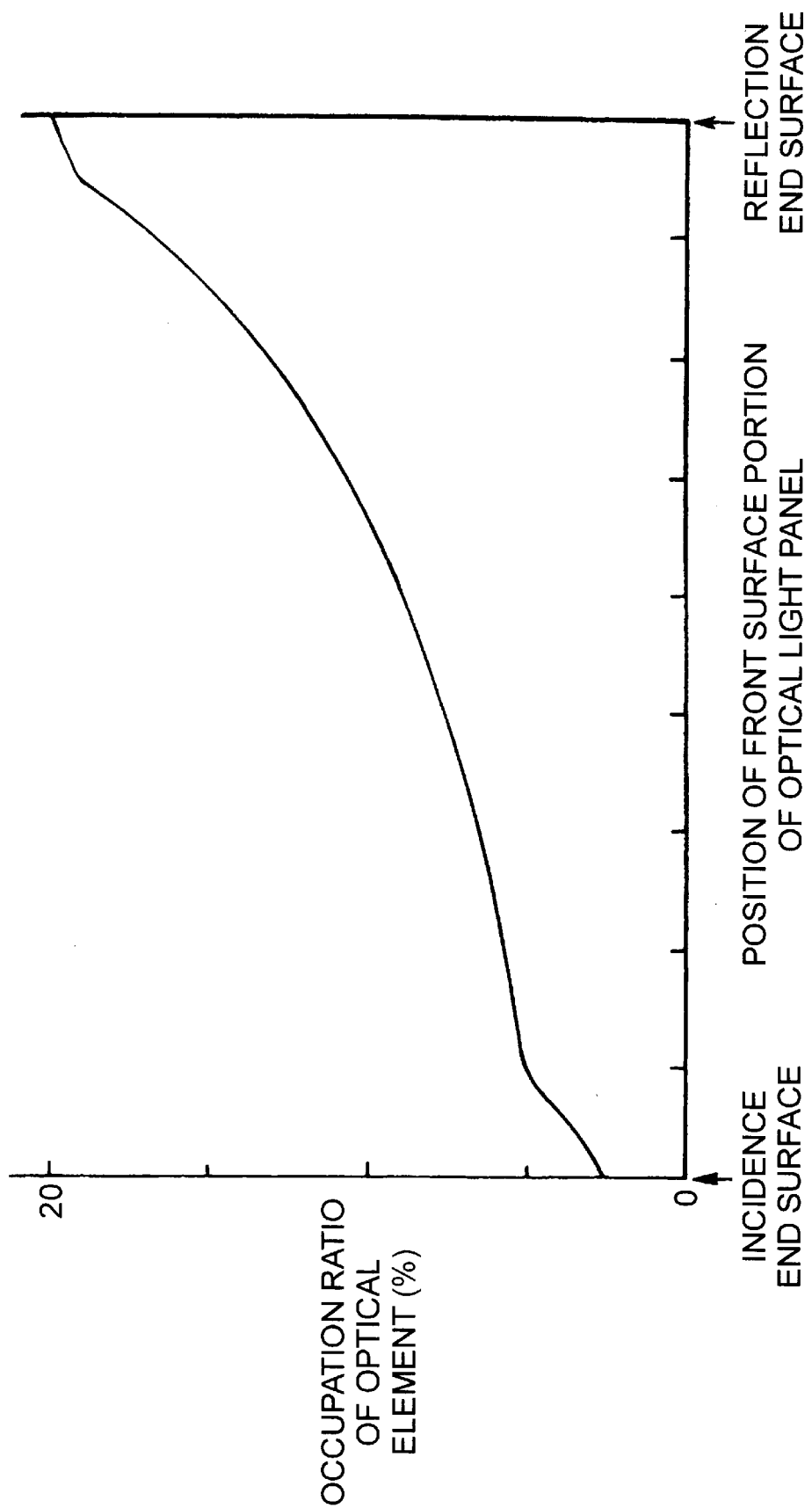
FIG. 5 is a graphical representation illustrating a distribution state of optical elements at the front surface portion of the light guide panel in the embodiment of FIG. 1.

Schematically illustrated in FIG. 3 is the front surface portion 15 of the light guide panel 12. FIG. 4 is an extracted and enlarged shape of the front surface portion 15 taken along a cross section shown by an arrow IV—IV of FIG. 3. Optical elements 22 as depicted in FIG. 4 are formed with an arc surface 21 of a predetermined radius R of curvature. Optical elements 22 are disposed randomly such that there is prevented a moire fringes pattern between the optical elements 22 and individual liquid crystal cells constituting the object O, e.g., a reflection type liquid crystal display.

The optical elements 22 are to effectively totally reflect light L impinging into the light guide panel 12 from the incidence end surface portion 13 and propagating in the same and guide it to the side of the back surface portion 16. Each optical element 22 has its diameter 2r set less than 150 μm such that the individual optical elements 22 are not discriminated with the naked eye.

In consideration of the occurrence of optical diffusion caused by a fact that the diameter is too small and to facilitate ease of fabrication of the optical element, the diameter is desirable to be 10 μm or more. Hence, it is necessary to properly set the radius of curvature R and a height h from the front surface portion 15 such that the diameter falls within a range of from 10 μm to 150 μm. It is generally desirable that the height h of the optical element 22 from the front surface portion 15 falls within a range of 1 to 50 μm.

Herein, the light guide panel 12 is designed such that when the refractive index of a material constructing the light guide panel 12 is indicated by n, the circular constant of a circle to its diameter by π, the radius of the optical element 22 by r, a relationship between the radius R of curvature of the arc surface 21 and the amount h of protrusion of the arc surface 21 from the front surface portion 15 satisfies:

$$h = R(1-\cos \epsilon)$$

and $$\{(2\pi/9)-(\beta/2)\} \leq \epsilon \leq \{(11\pi/36)-(\beta/2)\},$$

where $\beta = \sin^{-1}(1/n)$, $R = r/\sin \epsilon$.

Light incident on the light guide panel 12 is reduced in its energy as it progresses in the light guide panel 12. As such, it is necessary to gradually change the ratio of the light guide panel 12 to the optical elements 22 protruded on the front surface portion 15 of the same. To be concrete, the ratio of the optical elements 22 occupied per unit area of the front surface portion 15 (hereinafter described as an occupation ratio) is set larger as it goes to the side of the reflection end surface portion 19. Illustrated in FIG. 5, a relationship is provided between the position of the front surface portion 15 in the direction of progress (right in FIG. 1) of light from the light source 14 and the occupation ratio of the optical elements 22. The occupation ratio is set such that reflected light emanating from the back surface portion 16 provides uniform brightness over the entire back surface portion 16.

The front surface portion 15 located in close vicinity to the incidence end surface portion 13 of the light guide panel 12 is liable to have high brightness because light from the light source 14 directly transmits therethrough. As such, the occupation ratio of the optical elements 22 on the front surface portion 15 located in close vicinity to the incidence end surface portion 13 is set smaller than part thereof succeeding those optical elements 22. Likewise, the front surface portion 15 located in close vicinity to the reflection end surface portion 19 of the light guide panel 12 is liable to have higher brightness because reflected light from the reflection end surface portion 19 transmits therethrough. As such, the occupation ratio of the optical elements 22 on the front surface portion 15 located in close vicinity to the reflection end surface portion 19 is set slightly smaller than part thereof succeeding those optical elements 22.

In this embodiment, although the back surface portion 16 is set parallel to the front surface portion 15, the light guide panel may be formed into a taper in which the front surface portion 15 is slightly inclined (for example, from about 0.5 degree to 1 degree) with respect to the back surface portion 16. As such, an interval between the front surface portion 15 and the back surface portion 16 is narrower on the side of the reflection end surface portion 19 than on the side of the incidence end surface portion 13.

Figure 6:
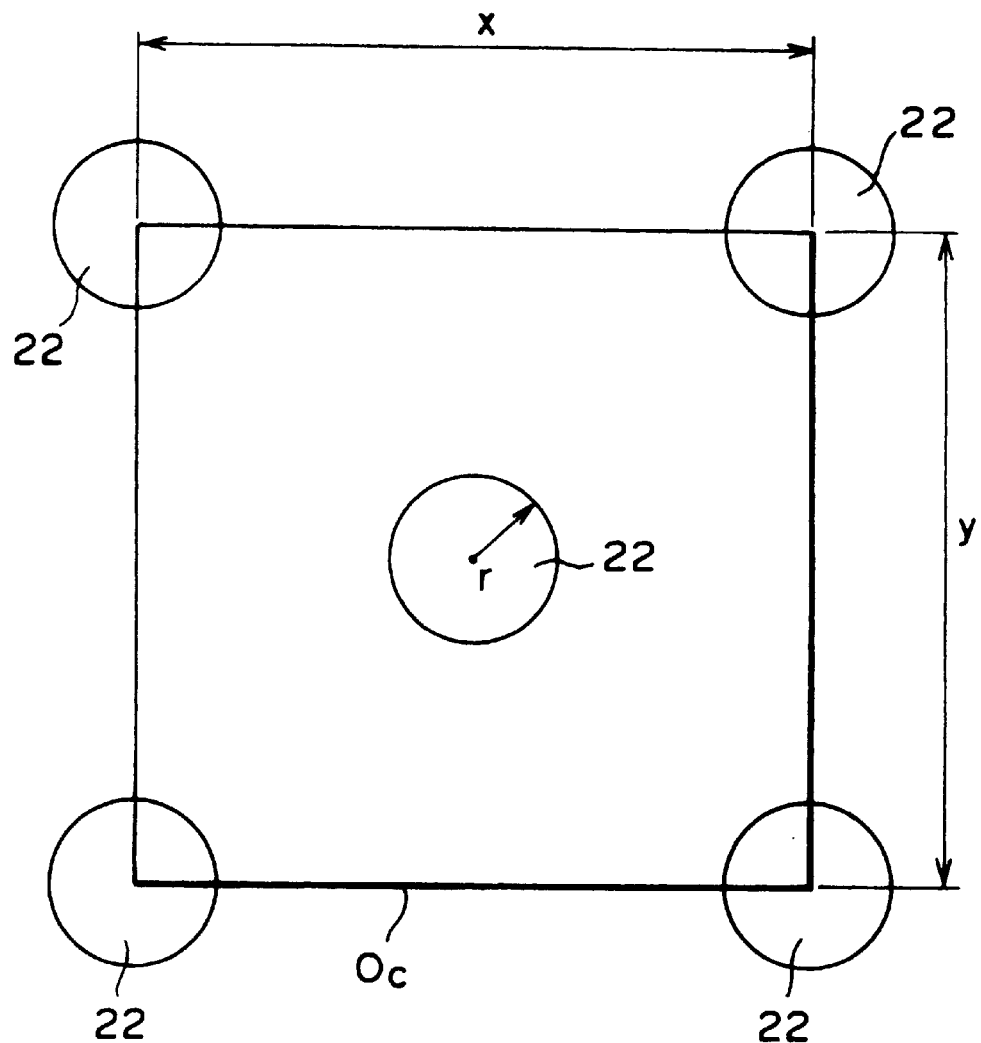
FIG. 6 is a schematic view for describing the density distribution of the optical elements on the front surface portion of the light guide panel.

When the object O is a reflection type liquid crystal display, as illustrated in FIG. 6 where a position relation between individual liquid crystal cells constituting the reflection type liquid crystal display and the optical elements 22 is schematically shown, it is effective to position the optical elements 22 at the center and four corners of the liquid crystal cell $O_c$. (Actually, the optical elements 22 are needed to be arranged randomly to prevent a moire fringes pattern from being produced.) Herein, the ratio (%) of the area of the optical element 22 to that of the liquid crystal cell $O_c$ can be represented by $(100 \cdot 2\pi r^2)/xy$, where x, y are longitudinal and lateral sizes of the rectangular liquid crystal cell, respectively.

When the ratio of the optical elements 22 occupying the entire front surface portion 15 is increased, the entire front surface portion is converted into a state of frost glass and is deteriorated in its transmission property. Observation through the light guide panel 12 is thus difficult. When the ratio of the optical elements 22 is too small, the amount of illumination of the illumination light to the side of the object O is reduced and hence the object becomes dark. Since the preferable size of the optical element 22 ranges from 10 to 150 μm, the ratio of the area of the optical element 22 to that of the liquid crystal cell $O_c$, i.e., the total area of the optical element 22 to that of the front surface portion 15, is desirably set to fall within the range of from 1 to 20% of the area of the front surface portion 15.

Figure 7:
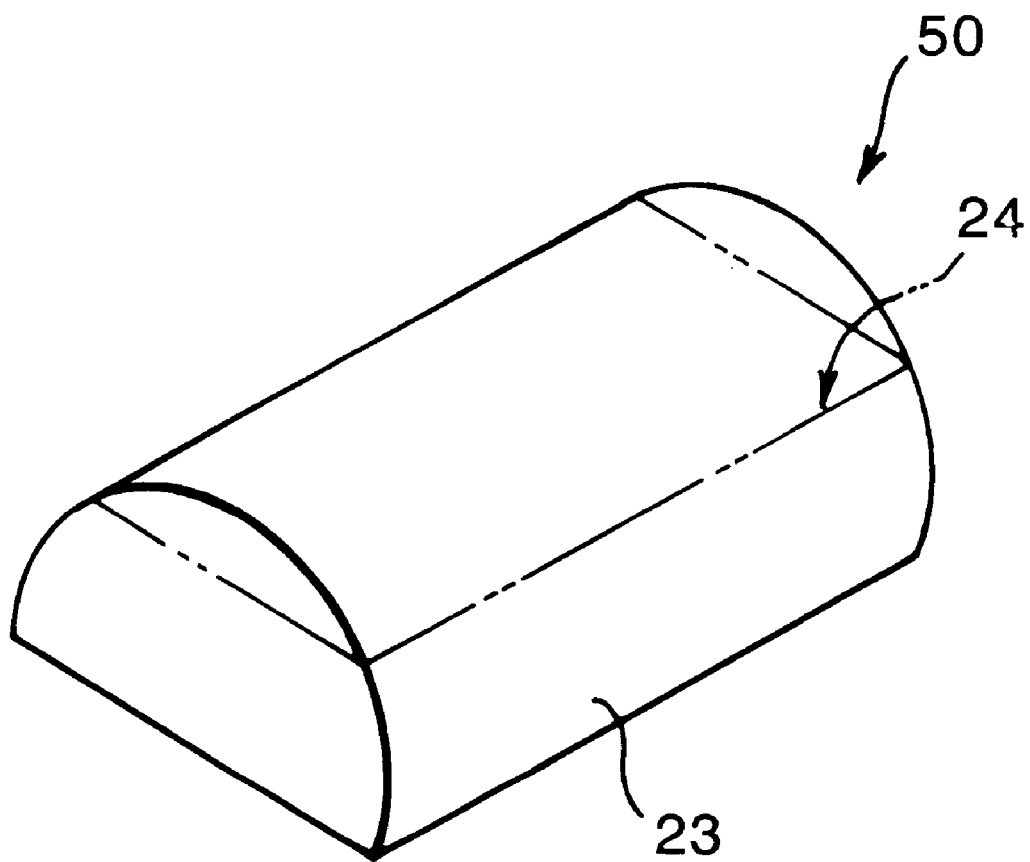
FIG. 7 is a perspective view illustrating an external appearance of another embodiment of the optical element.

In the aforementioned embodiment, the optical element 22 is formed with part of a spherical surface having the arc surface 21. Illustrated in FIG. 7 is an external appearance of another embodiment of an optical element 50 according to the present invention. The optical element 50 has a columnar surface 23 which takes as its center an axial line parallel to the incidence end surface portion 13. Alternatively, optical element 50 may be formed into a substantially trapezoidal configuration by forming a planar part 24 indicated by a two dot chain line on the top of the columnar surface 23. In other words, provided the optical element 50 has a surface configured to totally reflect the light propagating in the light guide panel 12 toward the side of the back surface portion 16 when the optical element 50 is at an angle where the light emanates to the observation position without being totally reflected on the front surface portion 15, any other configuration thereof may be used.

In these embodiments, the optical elements 22 and 50 are protruded from the front surface portion 15 to the outside of the light guide panel 12. In alternative embodiments, the same effect is ensured by forming intactly the optical element, having the aforementioned contour configuration, such that the optical element is concaved from the front surface portion 15 or the back surface portion 16 to the inside of the light guide panel 12.

When the optical element 22,50 is formed on the side of the front surface portion 15, as described above, the optical element 22,50 is basically needed to have a total reflection function. When the optical elements are protruded on the side of the back surface portion 16, provided the light propagating in the light guide panel 12 is at an angle where it is totally reflected on the back surface portion 16, the optical elements are needed to have a function where the light emanates to the side of the object O without totally reflecting the light on the back surface portion 15.

Figure 8:
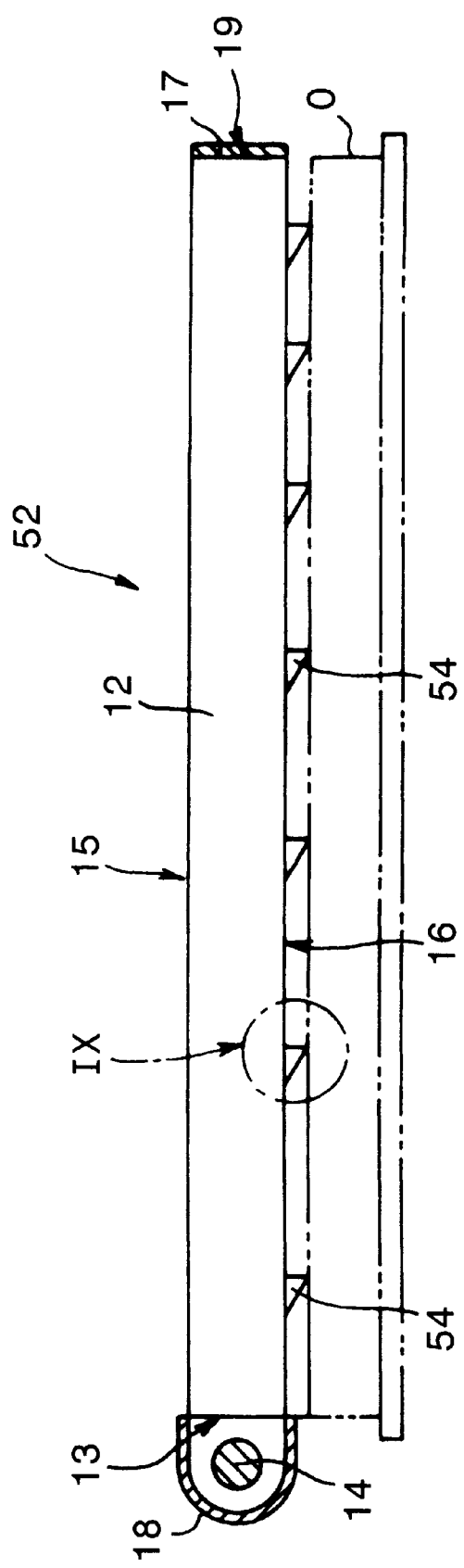
FIG. 8 is a cross section illustrating a broken state of a schematic structure of another embodiment of the plane illuminator apparatus according to the present invention.
Figure 9:
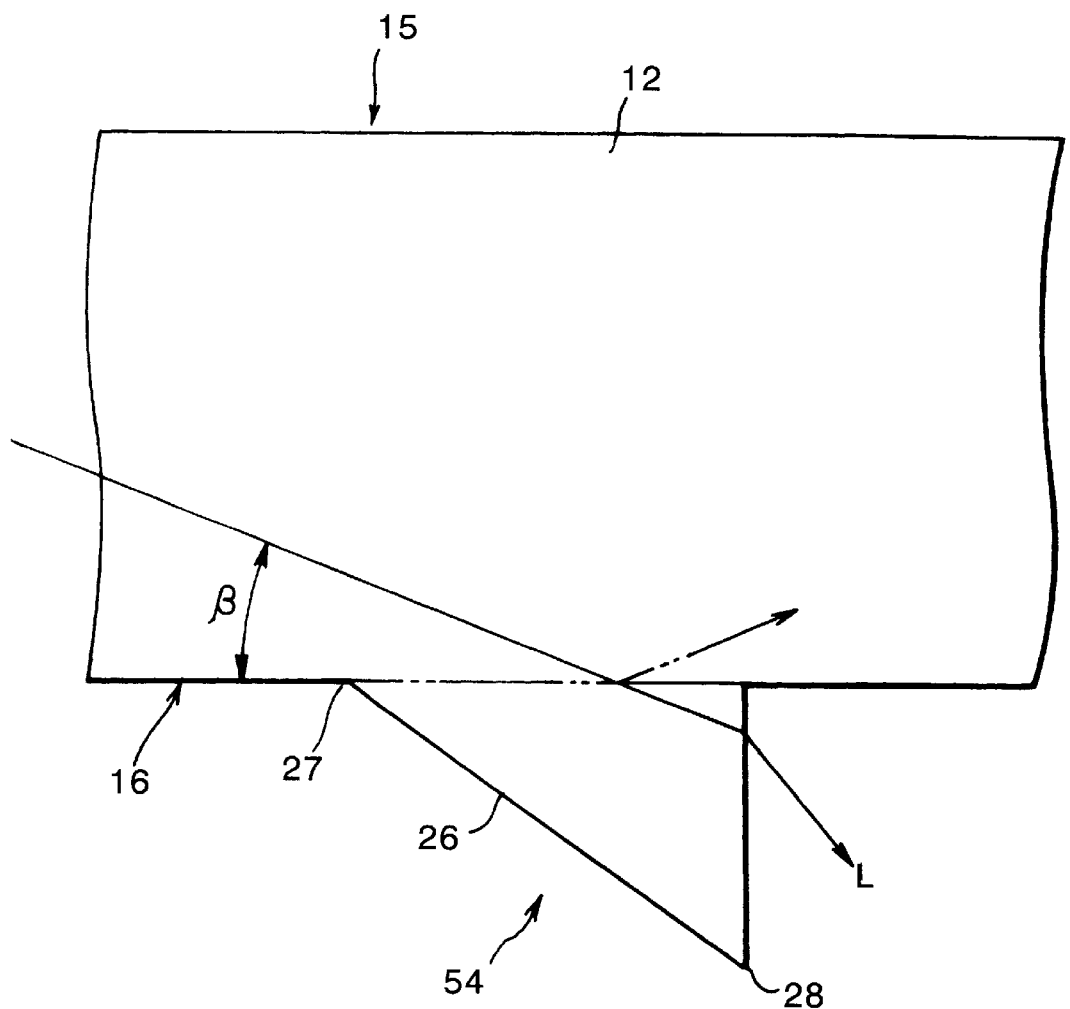
FIG. 9 is an extracted and enlarged cross section of an arrow IX in FIG. 8.
Figure 10:
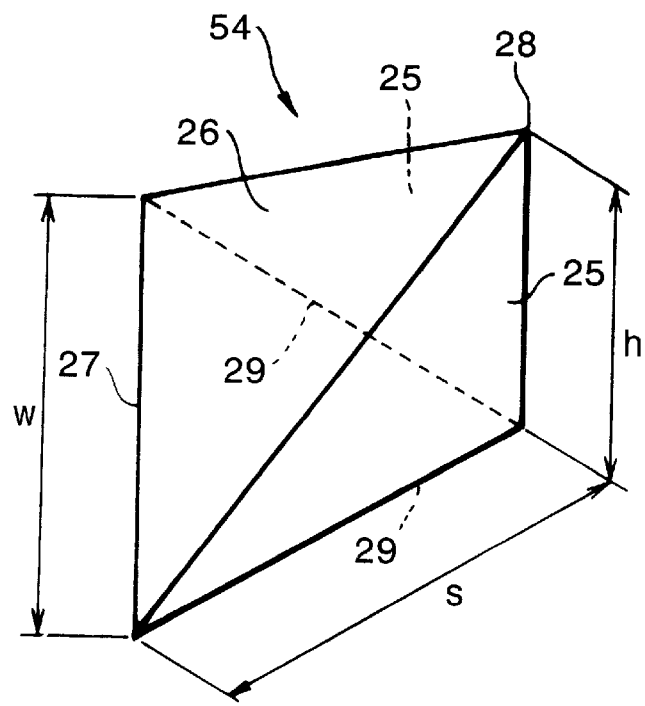
FIG. 10 is a perspective view illustrating the optical element of FIG. 8 and FIG. 9.

FIG. 8 illustrates a schematic structure of another embodiment of a plane illuminator apparatus 52 according to the present invention. FIG. 9 illustrates an extracted arrow IX part in FIG. 8 and FIG. 10 illustrates an external appearance of the optical element in FIG. 9. Identical symbols will be applied to like members having the identical functions to those in the foregoing embodiments, and overlapped descriptions will be omitted. Optical elements 54 are randomly disposed on the back surface portion 16 of the light guide panel 12 a triangular contour projects perpendicularly to the back surface portion 16. Optical element 54 includes a pair of symmetrical vertical pyramid surface 25 and an inclined pyramid surface 26, and is protruded into an isosceles triangle pyramid from the back surface portion 16. Herein, a bottom side 27 of the inclined pyramid surface 26 is set substantially parallel to the incidence end surface portion 13, and a top 28 of the inclined pyramid surface 26 is positioned on the side of the reflection end surface portion 19.

The optical element 54 in this embodiment forms a triangular pyramid in which the width of a diagonal line in the direction of progress of light L incident from the incident end surface portion 13, i.e., the length of the bottom side 27 of the inclined pyramid surface 26 is w, the length of a bottom side 29 of the vertical pyramid surface 25 is s, and the height from the back surface portion 16 is h, and illumination light emanates chiefly from the vertical pyramid surface 25 to illuminate the object O. The ratio of the aforementioned w and s, and the ratio of the aforementioned s and h are properly changeable. The length w of the bottom side 27 of the inclined pyramid surface 26 and the length s of the bottom side 29 of the vertical pyramid surface 25 preferably range within a range of from 1 to 150 μm. The height h from the back surface portion 16 preferably ranges within a range of from 1 to 50 μm.

The pair of the vertical pyramid surfaces 25 emanate, to the outside of the light guide panel 12, part of the light propagating in the light guide panel 12 toward the side of the reflection end surface 19 and emanate the same light toward the surface of the object O in a focused state. Thus optical elements 54 have a light focusing and emanating function.

Figure 11:
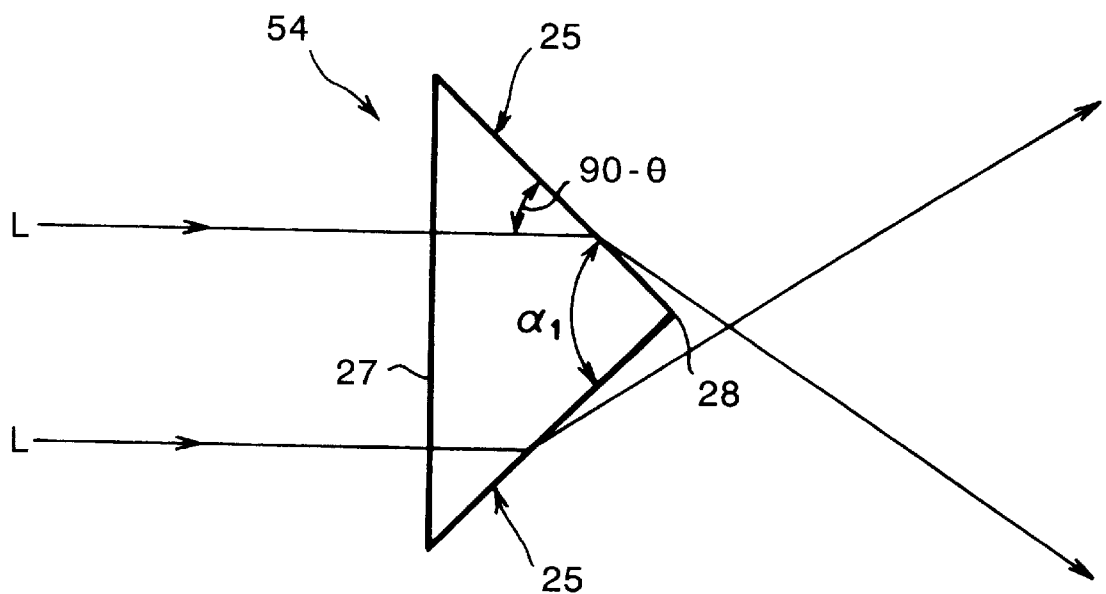
FIG. 11 is a plan view illustrating the optical element of FIG. 8 to FIG. 10.

Illustrated in FIG. 11 is a plane configuration of the optical element 54 viewed from the side of the back surface portion 16. In order to emanate the light L incident into the optical element 54 without totally reflecting the light on the pair of the vertical pyramid surfaces 25, an incidence angle θ of the light L to the vertical pyramid surface 25 is needed to satisfy:

$$\theta \leq \sin^{-1}(1/n),$$

when there is considered the light L advancing in a plane parallel to the back surface portion 16. Herein, an angle α1 between the pair of the vertical pyramid surfaces 25 is needed to satisfy:

$$\alpha 1 \geq \pi - 2\sin^{-1}(1/n),$$

using a relation;

$$\alpha 1 = 2 \cdot \{(\pi/2) - \theta\},$$

where π is the circular constant of a circle to its diameter. However, practically, a plane including an optical path of the light L is inclined to the back surface portion 16, and it is found that an angle α between the pair of the vertical pyramid surfaces 25 in the plane may satisfy:

$$\alpha 1 \geq \tan^{-1}[\cos \beta \cdot \tan \{\pi - 2\sin^{-1}(1/n)\}],$$

using a relation:

$$\tan \alpha = \cos \beta \cdot \tan \alpha 1,$$

when β is assumed to be an angle between the light L and the back surface portion 16.

To be concrete, in this embodiment where acrylic resin with the refractive index n of 1.49 is adopted as the light guide panel 12, α is needed to be about 95 degrees or more. As a practical problem, the plane including the optical path for the light L is inclined with respect to the back surface portion 16. Accordingly, in order for the light L to emanate from the optical element without being totally reflected on the vertical pyramid surface 25 a relation:

$$\beta \leq (3/2) \cdot \sin^{-1}(1/n)$$

is needed to be satisfied. Herein, with $\beta = (3/2) \cdot \sin^{-1}(1/n)$, the aforementioned α in this embodiment is about 135 degrees. It is thus preferable to form the optical element 22 such that α falls within a range of from 95 to 135 degrees.

Accordingly, part of the light L incident into the light guide panel 12 from the incidence end surface portion 13 and totally reflected on the back surface portion 16 impinges into the optical element 54. The light emanates in a focused state from the optical element 54 to the outside of the light guide panel 12. The light illuminates the object O to ensure observation of the bright object O through the light guide panel 12.

When the triangular pyramid-shaped optical element 54 is formed on the side of the front surface portion 15, the optical element 54 is set in an opposite direction so as to permit the top 28 to be located closer to the side of the incidence end surface portion 13 than the bottom side 27. Hence, light incident on the optical element is totally reflected on the inclined pyramid surface.

Figure 12:
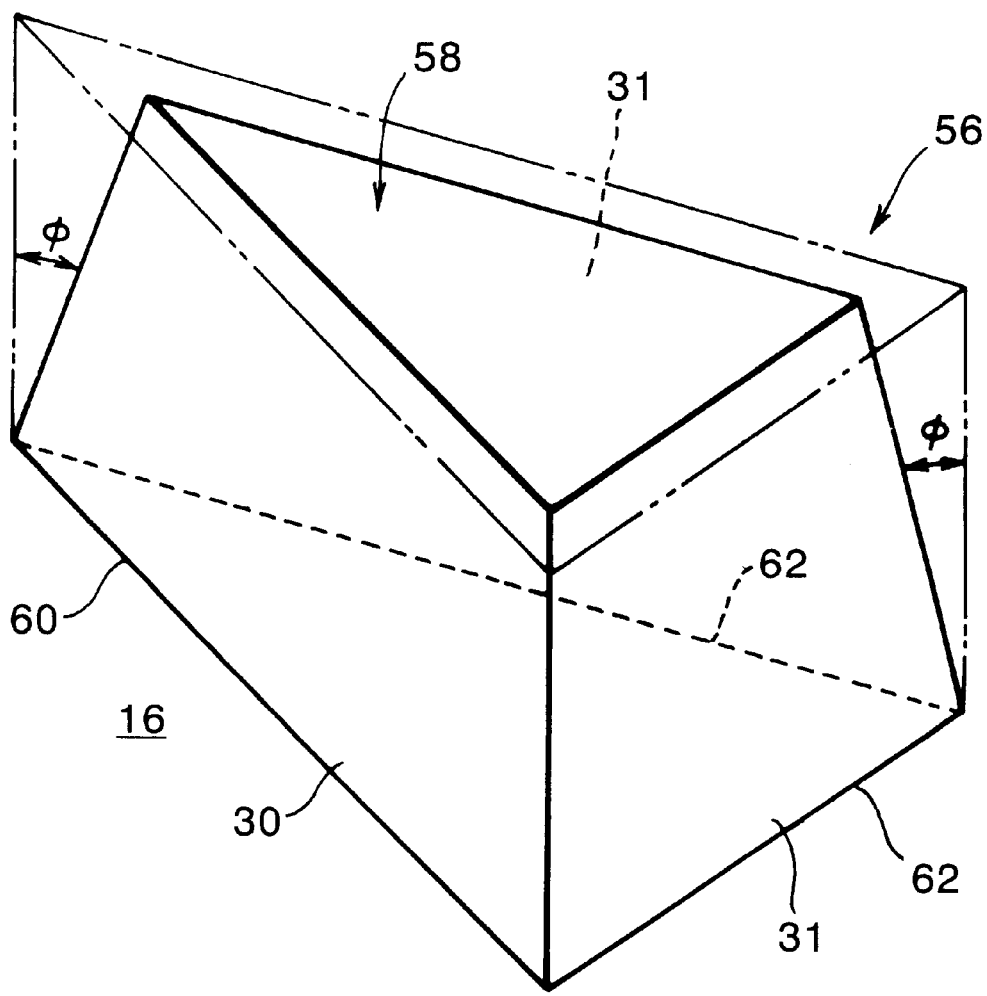
FIG. 12 is a perspective view illustrating an outer appearance of another embodiment of the optical element.

Further, the optical element 54 in this embodiment is formed into the triangular pyramid. Illustrated in FIG. 12 is an alternative optical element 56 formed into a trapezoid having a plane part 58 parallel to the back surface portion 16. A vertical wall surface 30 having a bottom side 60 is directed toward the side of the incidence end surface portion 13. A pair of vertical wall surfaces 31 each have a bottom side 62 and are disposed symmetrically to the vertical wall surface 30. Vertical wall surfaces 30 may be inclined such that an angle φ formed between the back surface portion 16 and a vertical surface ranges from 0 to about 60 degrees. This ensures a drawing slope for a mold upon molding of the light guide panel 12.

Figure 13:
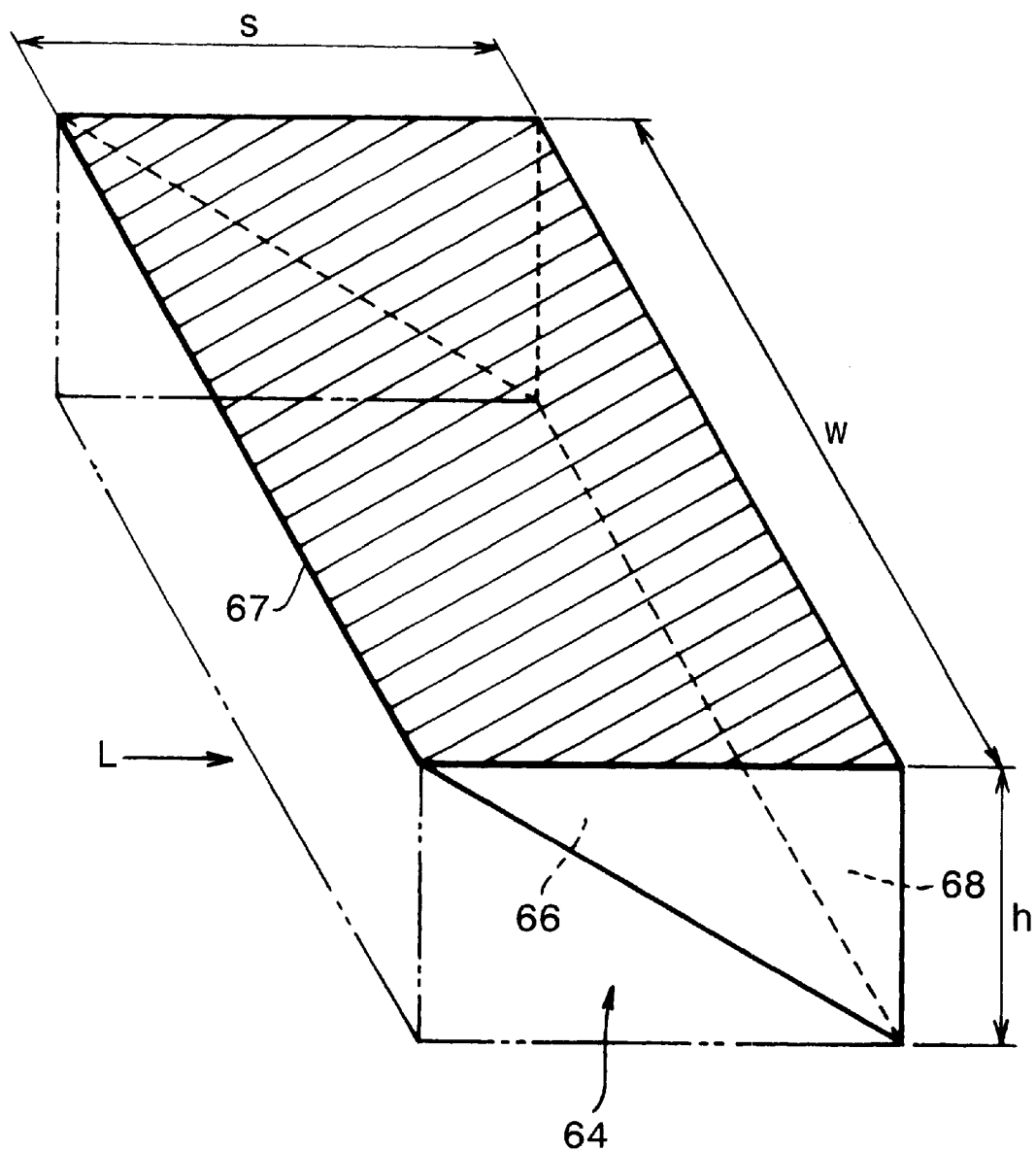
FIG. 13 is a perspective view illustrating an external appearance of another embodiment of the optical element.

FIG. 13 illustrates an external appearance of another embodiment of an optical element 64 usable for the light guide panel and the plane illuminator apparatus, extracted and enlarged. Hatched areas in the figure show a junction area between the back surface portion 16 and the optical element 64. An arrow indicates the direction of progress of the light L, i.e., a direction perpendicular to the incidence end surface portion 13.

The optical element 64 in this embodiment is triangular prismatic-shaped corresponding to a rectangular parallelepiped shown by a two dot chain line. The optical element 64 has an inclined face 66 that extends between a bottom side 67 and a vertical wall surface 68. The lateral width of optical element 64 perpendicular to the direction of progress of the light L is w, length in the direction of progress of the light L is s, height from the back surface portion 16 is h, and the light L emanates from the vertical wall surface 30 mainly directed toward the reflection end surface portion 19 to illuminate the object O. Accordingly, the optical element 64 is constructed into a rectangular parallelepiped shown by a two dot chain line in FIG. 13 substantially without losing its function.

Figure 14:
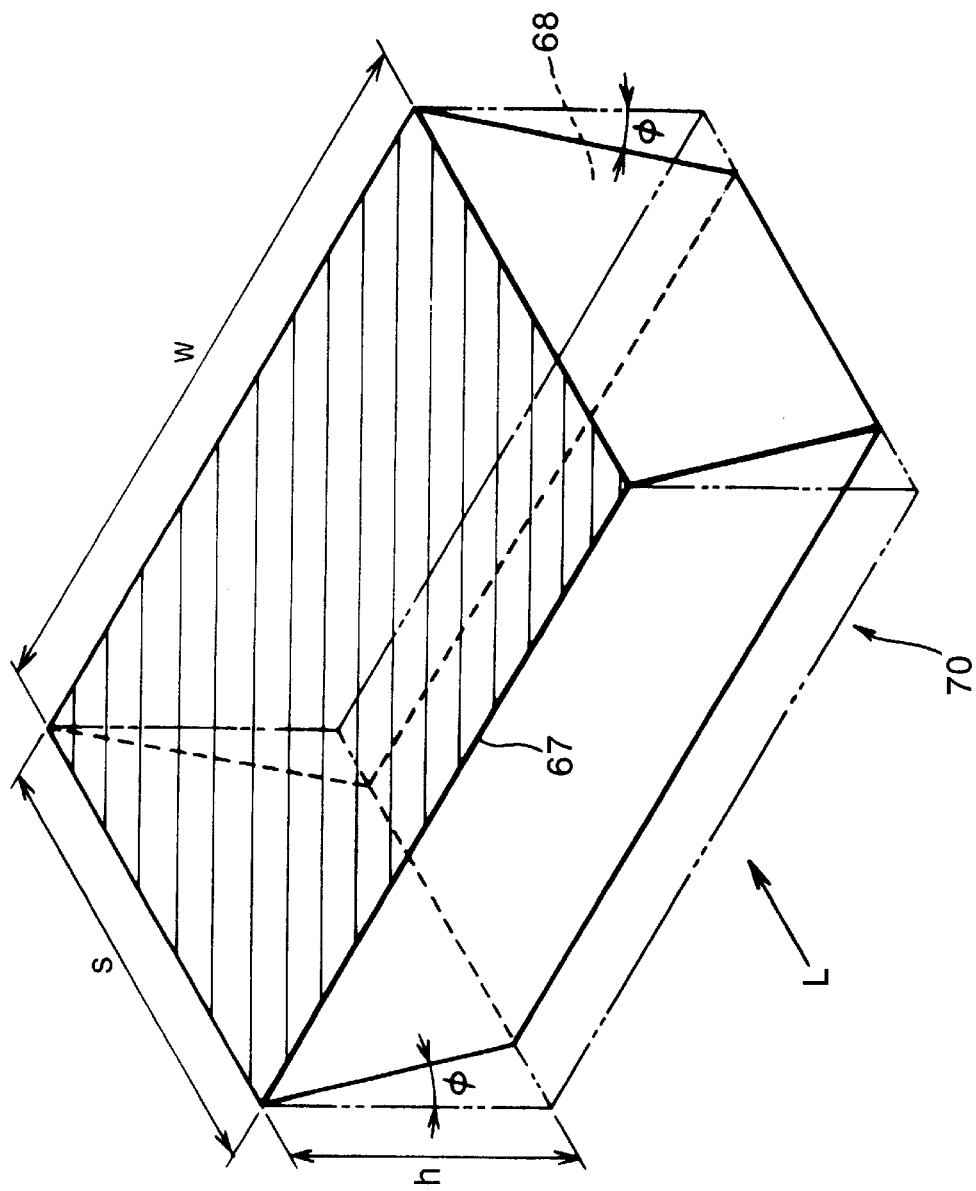
FIG. 14 is a perspective view illustrating still another embodiment of the optical element.

Illustrated in FIG. 14 is another embodiment of an optical element 72. In order to provide a drawing gradient for a mold, the optical element 72 may be constructed into a trapezoid. A ratio of the lateral width w and the length s, and the length s and the height h from the back surface portion 16 are properly changeable, and identical symbols will be applied to like members with the same functions as those of the previous embodiments.

Figure 15:
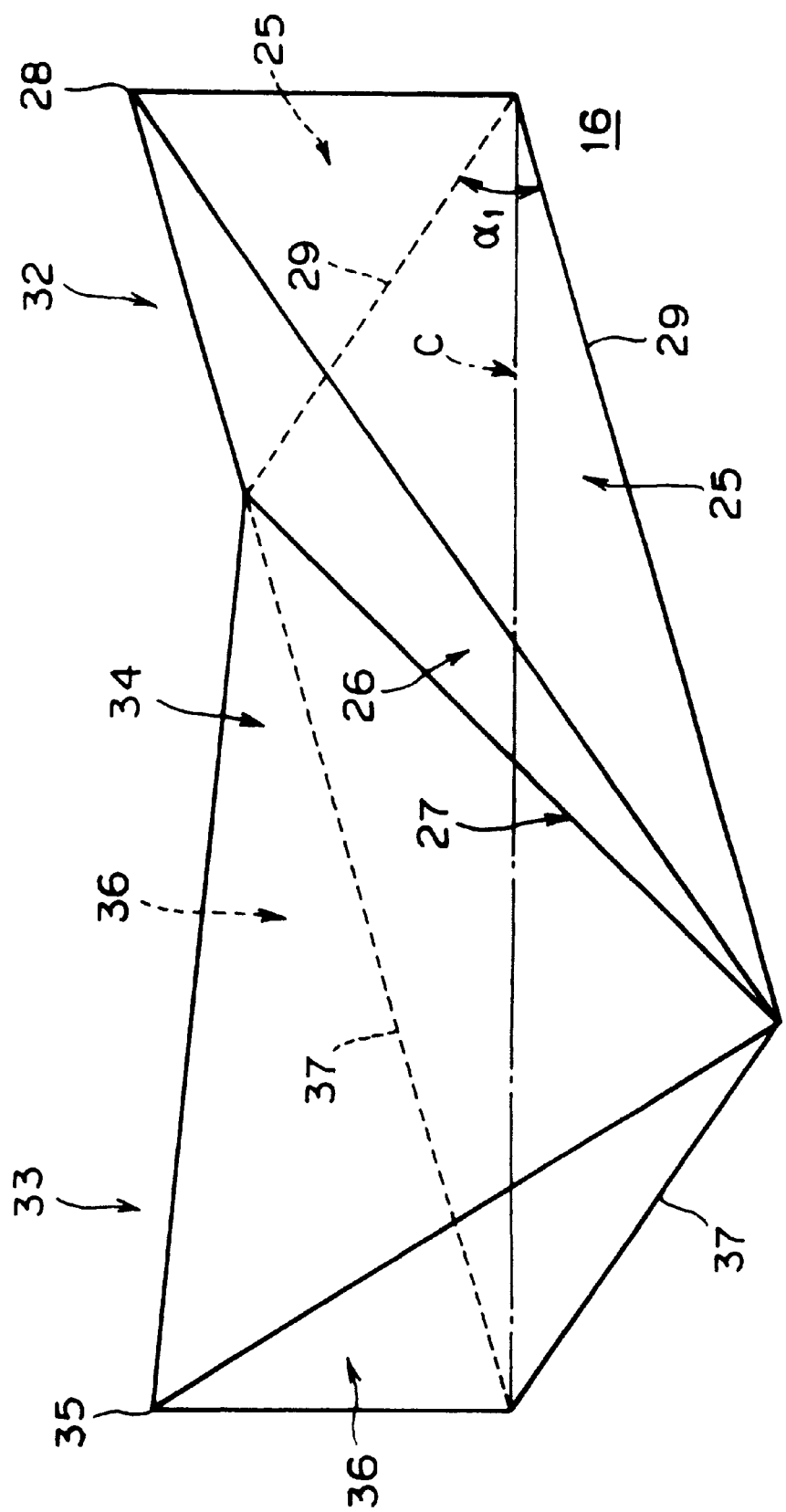
FIG. 15 is a perspective view illustrating an external appearance of a different embodiment of the optical element.

FIG. 15 illustrates an external appearance of another embodiment of the present invention including a second optical element corresponding to the optical element 22 shown in FIGS. 8 to 11. Identical symbols will be simply applied to like members having the same functions as those of the members of the previous embodiment, and overlapped descriptions will be omitted.

An optical element 32 in this embodiment (hereinafter, called a first optical element 32 for brevity) and a second optical element 33 are formed so as to protrude outwardly from the back surface portion 16 (refer to FIG. 8.) of the light guide panel 12. The first optical element 32 corresponds to the optical element 54 of the embodiment illustrated in FIGS. 8 to 11.

The second optical element 33 is combined with the first optical element 32 such that it makes contact with and faces the bottom side 27 of the inclined pyramid surface 26 of the first optical element 32. These elements form a rhombus as a whole in their projection configuration projected perpendicularly to the back surface portion 16. The second optical element 33 is adapted such that the top 35 with respect to the bottom side 27 of the inclined pyramid surface 26 of the first optical element 32 is set substantially parallel to the incidence end surface portion 13 (refer to FIG. 8.). That is, the top 35 with respect to the bottom side 27 of the inclined pyramid surface 34 of the second optical element 33 is located on the side of the incidence end surface portion 13 from the bottom side 27. This ensures an isosceles triangular pyramid further having a pair of symmetrical vertical pyramid surfaces 36.

In this embodiment, the first optical element 32 and the second optical element 33 are set in a mirror image relation with the bottom side 27 taken as a symmetrical axis. Herein, the length of the bottom surface 37 of the other vertical pyramid surface 36 may be different from the length of the bottom side 29 of the vertical pyramid surface 25 of the first optical element 32. They are desirably symmetrical with respect to a diagonal line C extending perpendicularly to the bottom side 27 of the inclined pyramid surfaces 26, 36.

The second optical element 33 chiefly serves to totally reflect to the side of the back surface portion 16 the light returning in the light guide panel 12 from the side of the refection end surface portion 19 (refer to FIG. 1.) to the side of the incidence end surface portion 13.

In the aforementioned embodiment, although the first optical element 32 and the second optical element 33 are set into a combined configuration, the second optical elements 33 are separately disposed from the first optical elements 32 with different distribution states. For example, the second optical elements 33 are disposed more densely as they go to the side of the incidence end surface portion 13. Hereby, also the light returned from the side of the reflection end surface portion 19 is more uniformly totally reflected to the side of the back surface portion 16 of the light guide panel 12 to effectively illuminate the object O.

It is herein noted that the aforementioned optical elements can be formed on both the front surface portion 15 and the back surface portion 16. It is desired, however, that the total area of these optical elements be set within a range of from 1 to 20% with respect to any one area of the front surface portion 15 and the back surface portion 16.

In one embodiment, a plurality of the optical elements 22, 32, 33, 50, 54, 56, 64, 72 are formed randomly on at least one of the front surface portion 15 and the back surface portion 16 of the light guide panel 12. The optical elements emanate the light L propagating in the light guide panel 12 from the incidence end surface portion 13 toward the object O. The total area of these optical elements 22, 32, 33, 50, 54, 56, 64, 72 is set within a range of from 1 to 20% of the area of the front surface portion 15 or the back surface portion 16 as described above. As a result, illumination luminous flux emanating from the back surface portion 16 of the light guide panel 12 is illuminated to the object O and an illuminated portion of the object O is observed from an observation position through the light guide panel 12. Henceforth, this embodiment is also usable as a compact thin type illuminator apparatus for reflection type liquid crystal display.

When a ratio of the optical elements 22, 32, 33, 50, 54, 56, 64, 72 per unit area occupying the front surface portion 15 and/or the back surface portion 16 is set larger as the optical elements move away from the incidence end surface portion 13 or when a ratio of the optical elements 22, 32, 33, 50, 54, 56, 64, 72 per unit area occupying the front surface portion 15 and/or the back surface portion 16 is set such that opposite ends in a width direction of the front surface portion 15 and/or the back surface portion 16 in a longitudinal direction of the incidence end surface portion 13 become relatively large, the quantity of light illuminated from the front surface portion and/or the back surface portion 16 is made uniform over the entire area of the front surface portion 15 and the back surface portion 16 of the light guide panel 12 for ensuring of illumination light without even illumination.

When the size of the optical elements 22, 32, 33, 50, 54, 56, 64, 72 is set at 150 $\mu$m or less, upon observation of the object O through the light guide panel 12 from the observation position, the object O can be observed without noticing the existence of the optical elements 22, 32, 33, 50, 54, 56, 64, 72.

In the aforementioned embodiment, the present invention is used for illumination for a reflection type liquid crystal display. In FIGS. 16 to 28, embodiments are illustrated of a light guide panel applied for illumination of a transmission type liquid crystal display and of a plane illuminator apparatus using the light guide panel.

Figure 16:
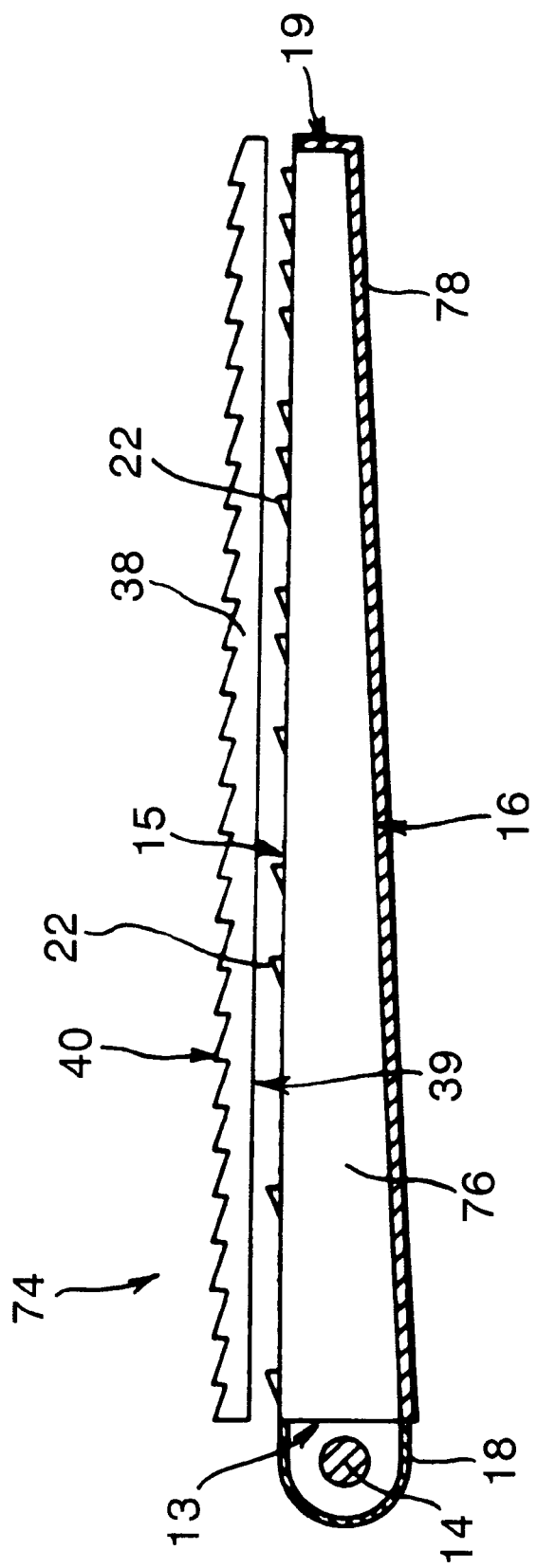
FIG. 16 is a cross section illustrating a schematic structure of another embodiment of the plane illuminator apparatus according to the present invention.
Figure 17:
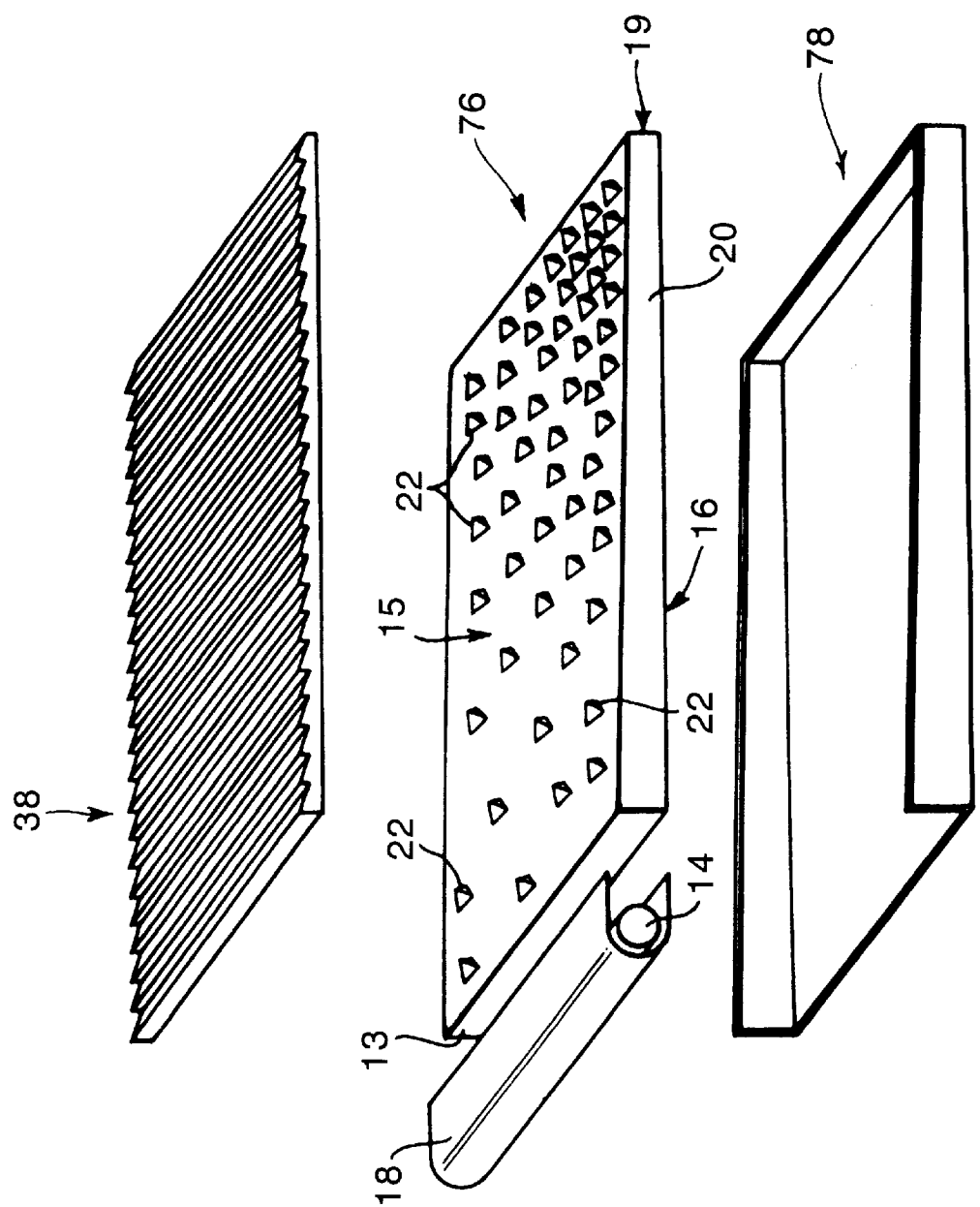
FIG. 17 is a decomposed perspective view illustrating the embodiment of FIG. 16.

FIG. 16 illustrates a cross sectional structure of a plane illuminator apparatus 74 according to this embodiment. FIG. 17 illustrates an external appearance of the plane illuminator apparatus 74 in a decomposed state. Identical symbols will be simply applied to like members having the identical functions to those of the previous embodiments, and overlapped descriptions will be omitted. Plane illuminator apparatus 74 includes a light guide panel 76, a light source 14, and a light deflection plate 38 superimposed on the front surface portion 15 of the light guide panel 76. A light reflection sheet 78 covers a portion of the light guide panel excepting the incidence end surface portion 13 and the front surface portion 15 of the same.

The light guide panel 76 in this embodiment is tapered such that the back surface portion 16 is inclined by about 0.5 to 1 degrees with respect to the front surface portion 15. As such, an interval between the front surface portion 15 and the back surface portion 16 is narrower as it goes to the side of the reflection end surface portion 19 with respect to the side of the incidence end surface portion 13.

The foregoing light reflection sheet 78 covers the reflection end surface portion 19, a pair of the side end surface portions 20, and the back surface portion 16, all of the light guide panel 12. Light reflection sheet 78 reflects light emanating from these parts into the light guide panel 76 such that the light emanates from the front surface portion 15 of the light guide panel 76. Light reflection sheet 78 is formed by folding a white colored paper, etc.

Figure 18:
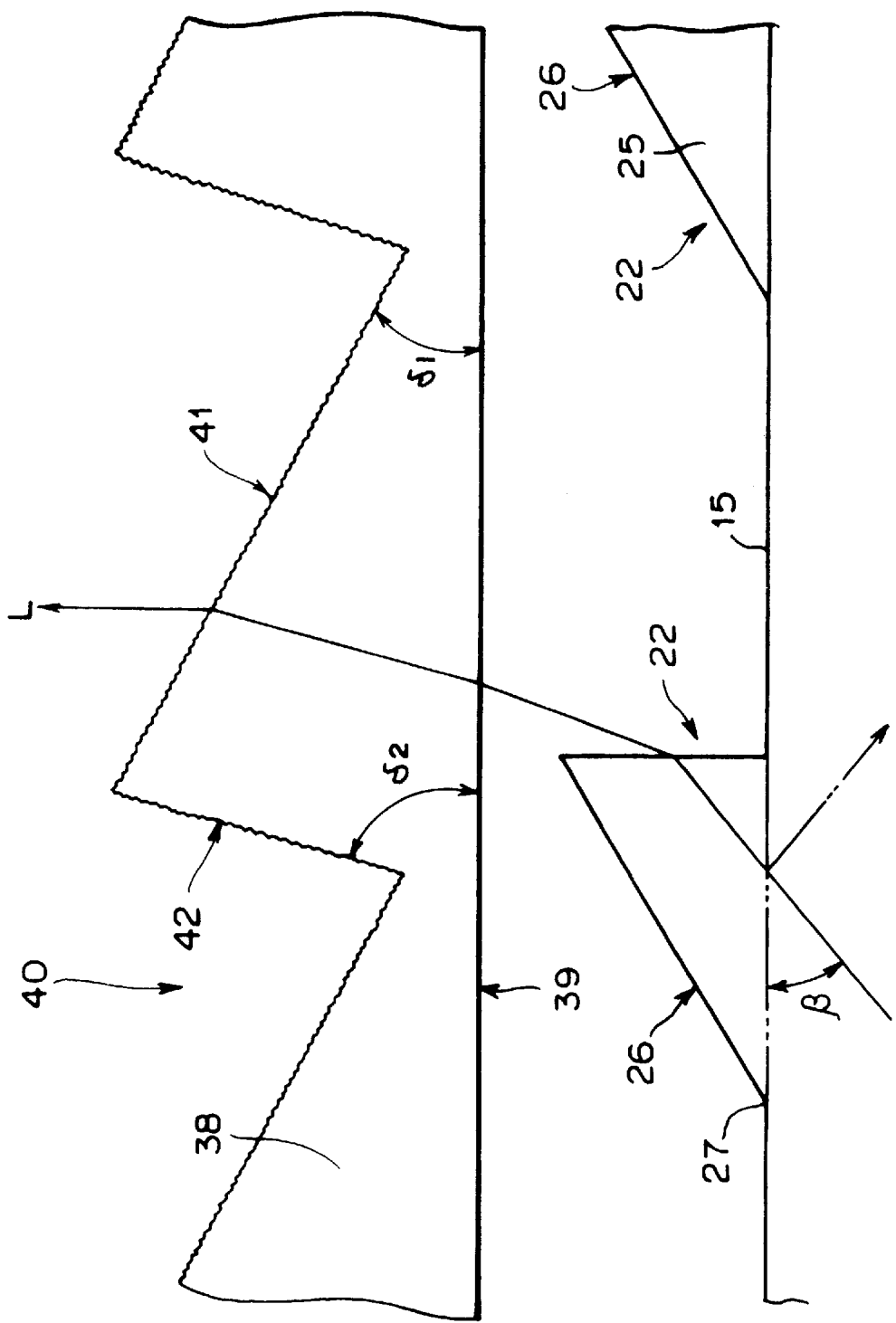
FIG. 18 is an enlarged side view extracting and illustrating side configurations of a front surface portion and a light deflection plate in the embodiment of FIG. 16.

Illustrated in FIG. 18 are enlarged side configurations of the front surface portion 15 and the light deflection plate 38. On the front surface portion 15 of the light guide panel 76 there are randomly arranged the optical elements 22 configured into an isosceles triangular pyramid. The pyramid has a contour configuration projected perpendicularly to the front surface portion 15 being a triangle and includes a pair of symmetrical vertical pyramid surface 25 and an inclined pyramid surface 26. Care is taken that a moire fringes pattern is prevented from being produced between the optical elements 22 and the light deflection plate 38 and between cells of a liquid crystal panel and the optical elements 22 when the plane illuminator apparatus 74 is used as a backlight source of a liquid crystal display. The optical element 22 serves to deflect the vertically directed light L emanating from the front surface portion 15 and has the same 27 configuration as that of the optical element 22 in the aforementioned embodiment illustrated in FIGS. 10 and 11.

The vertical pyramid surface 25 of the optical element 22 is preferably perpendicular to the front surface portion 15. To set a proper drawing gradient for a mold to facilitate fabrication of the light guide panel 76, the vertical pyramid surface 25 may be set such that an angle of the vertical pyramid surface 25 with respect to the front surface portion 15 exceeds 90 degrees. The bottom side 27 of the inclined pyramid surface 26 of the optical element 22 is set substantially parallel to the incidence end surface portion 13.

The light L incident at an incidence angle with respect to the incidence end surface portion 13 of the light guide panel 76, i.e., at an angle β with respect to the front surface portion 15, progress in the light guide panel 76 in the range of the incidence angle β satisfying $$0 \leq |\beta| \leq \sin^{-1}(1/n)$$

in response to the refractive index n (n=1.49 in the case of acrylic resin in this embodiment) of a material constituting the light guide panel 76. Part of the light propagating to the side of the front surface portion 15 enters the optical element 22. Another part of the light emanates from the front surface portion 15 intactly to the outside of the light guide panel 76. A remaining part of the light is totally reflected on the front surface portion 15 and is transmitted to the side of the back surface portion 16.

Figure 19:
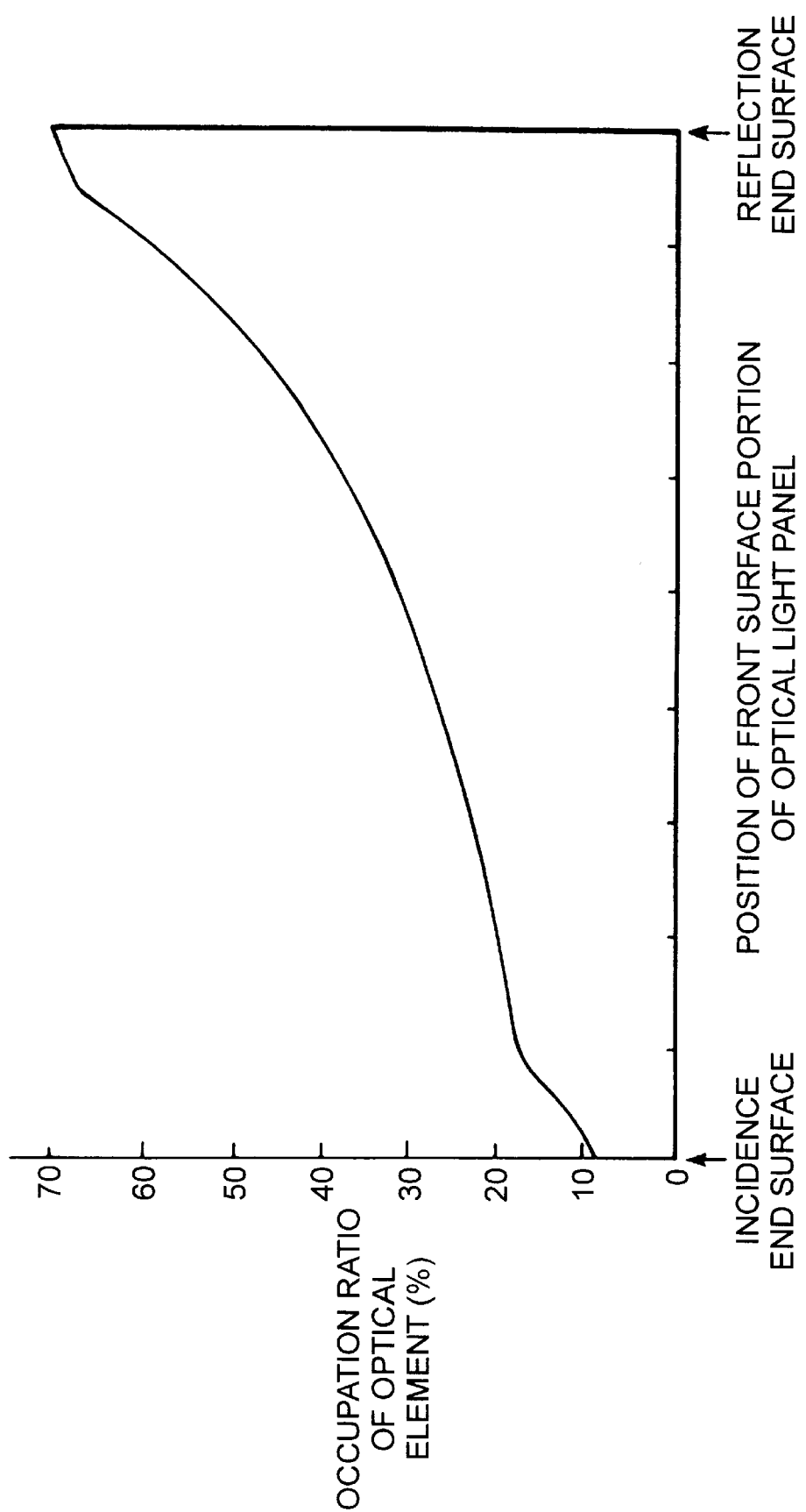
FIG. 19 is a graphical representation illustrating a relationship between the front surface portion of the light guide panel extending from an incidence end surface portion to a reflection end surface portion and an occupation ratio of the optical element per unit area of the front surface portion.

An occupation ratio of the optical elements 22 protruded on the front surface portion 15 of the light guide panel 76 is randomly set such that the side of the reflection end surface portion 19 provides a large occupation ratio. FIG. 19 shows a relation between the position of the front surface portion 15 along the direction of progress of the light from the light source 14 (right direction in FIG. 16) and the occupation ratio of the optical elements 22. The occupation ratio is preferably set at a density at about 3.5 times lighter than the previous embodiment corresponding to the reflection type liquid crystal display.

When an emission region of the light source 14 is shorter than the size of the width of the incidence end surface portion 13 of the light guide panel 76, the quantity of light incident on the width direction opposite side ends of the light guide panel 76 is liable to be insufficient. It is therefore desirable to set the occupation ratio of the optical elements 22 at the width direction opposite side ends of the front surface portion 15 of the light guide panel 76 relatively larger than the other portion. In any case, although in this embodiment a maximum of the occupation ratio of the optical elements 22 is set to about 70%, it is of course possible to set the same to a larger value than the former.

The light deflection plate 38 in this embodiment includes a smooth plane part 39 formed with transparent acrylic resin. Smooth plane part 39 opposes the front surface portion 15 of the light guide panel 12. Light deflection plate 38 also includes a triangular prismatic-shaped surface 40 extending parallel to the incidence end surface portion 13 of the light guide panel 12 and arranged perpendicularly to the incidence end surface portion 13. The prismatic-shaped surface 40 includes a first inclination surface 41 where an interval between it and the plane part 39 increases as it goes to the side of the incidence end surface portion 13 of the light guide panel 76. Prismatic-shaped surface 40 also includes a second inclination surface 42 succeeding the first inclination surface 41. An angle δ1 formed between the plane part 39 and the first inclination surface 41 is set smaller than an angle δ2 between the plane part 39 and the second inclination surface 42. For example, δ1 is set (28±3) degrees and δ2 is set (62±3) degrees.

The prismatic-shaped surface 40 in this embodiment has fine unevenness with proper surface roughness for diffusing light emanating from the prismatic-shaped surface 40 to some degree, and the fine unevenness may be formed on the plane part 39. Although the optical element 22 is set to be a triangular pyramid, it may be formed into a triangular prism as in the previous embodiment shown in FIG. 12. In this case there is ensured a light guide panel having the same efficiency as that of the previous embodiment.

Figure 20:
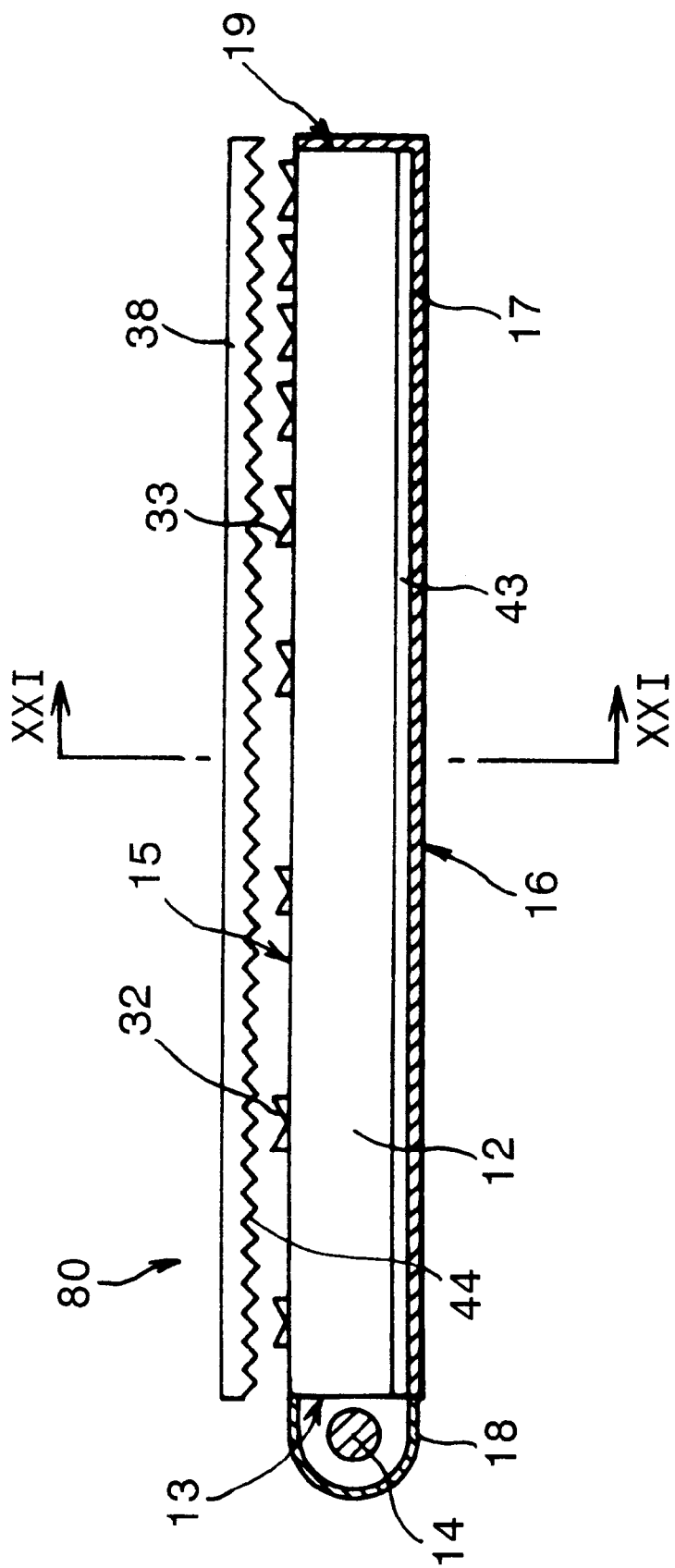
FIG. 20 is a cross section illustrating a schematic structure of another embodiment of the plane illuminator apparatus of the present invention.
Figure 21:
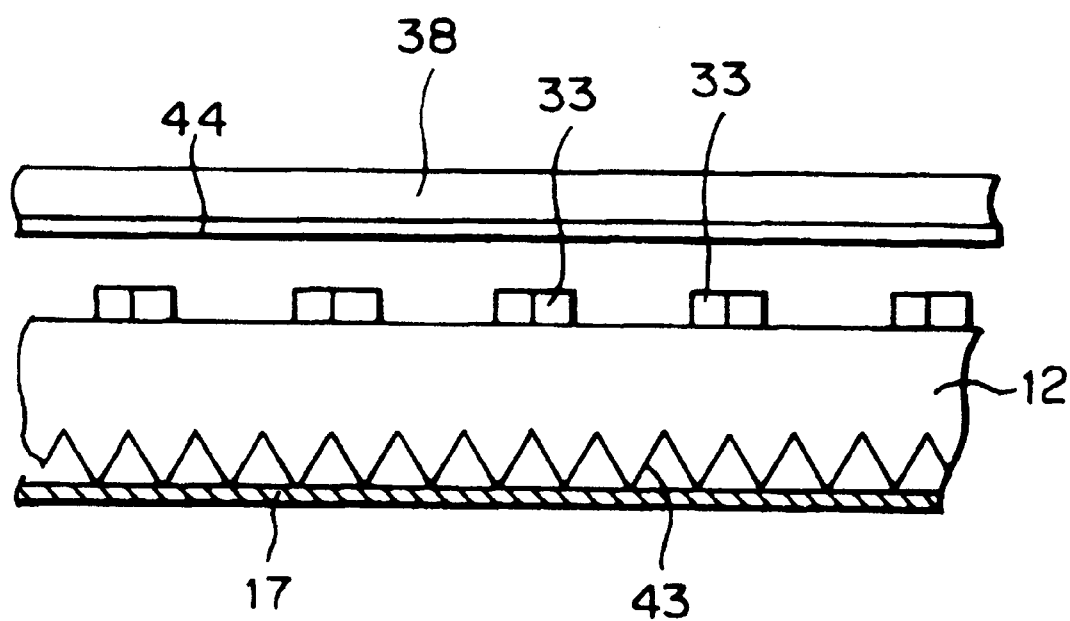
FIG. 21 is a cross section taken along an arrow XXI—XXI in FIG. 20.

FIG. 20 illustrates a cross sectional structure of another embodiment of a plane illuminator apparatus 80 according to the present invention. FIG. 21 illustrates a cross sectional structure taken along an arrow XXI—XXI. Identical symbols are applied to like members of the same function as those of the previous embodiment. On the front surface portion 15 of the light guide panel 12 there are formed a first optical element 32 and a second optical element 33 each having a contour configuration projected perpendicularly to the front surface portion 15. The contour configurations are triangular and are in a state where they face each other. Optical elements 32, 33 have the same configuration as that of the previous embodiment shown in FIG. 15.

The second optical element 33 chiefly serves to transfer the light returning in the light guide panel 12 from the side of the reflection end surface portion 19 to the side of the incidence end surface portion 13 to the outside of the front surface portion 15. This embodiment eliminates the need of inclining the back surface portion 16 into a tapered shape with respect to the front surface portion 15, as in the previous embodiment. It is thus possible to set the side of the incidence end surface portion 13 and the side of the reflection end surface portion 19 to uniform plate thicknesses.

On the back surface portion 16 of the light guide panel 12 there is formed a triangular prismatic-shaped surface 43. Surface 43 is arranged parallel to the incidence end surface portion 13 and extends perpendicularly to the incidence end surface portion 13 to provide a well known optical reflection function. Direction of emanating light is controlled substantially perpendicularly from the front surface portion 15 of the light guide panel 12 with the aid of these first and second optical elements 32, 33 and the prismatic-shaped surface 43.

The prismatic-shaped surface 44 of the light deflection plate 38 in this embodiment is arranged such that it is an acute-angle isosceles triangle prism with a vertical angle being less than 90 degrees. Prismatic-shaped surface 44 is superimposed on the front surface portion 15 of the light guide panel 12 such that it opposes the front surface portion 15 of the light guide panel 12.

In this embodiment, the light returning in the light guide panel 12 from the side of the reflection end surface portion 19 to the side of the incidence end surface portion 13 is actively intended to be derived from the front surface portion 15 so that highly bright light can be emitted in the direction opposite to the front surface portion 15 of the light guide panel 12.

In the aforementioned embodiment, the first optical element 32 and the second optical element 33 are set into a combined configuration. In an alternative embodiment, they may be configured into a quadrangular pillar by setting the inclined pyramid surfaces 26, 34 (refer to FIG. 15.) parallel to the front surface portion 15. This configuration ensures a light guide panel with the same excellent efficiency as that of the previous embodiment. Further, the second optical elements 33 may be disposed, separated from the first optical elements 32 in a distribution state different from that of the first optical elements 32. For example, in one embodiment the second optical elements are more distributed as they go to the side of the incidence end surface portion 13. As a result, light returned from the side of the reflection end surface portion 19 can be derived more uniformly from the front surface portion 15 of the light guide panel 12.

A plurality of the optical elements 22, 32, 33 which have a light collection property and a direction control property and which serve to emit light incident from the incidence end surface portion 13 of the light guide panel 12 are formed on the front surface portion 15 and/or the back surface portion 16 of the light guide panel 12. As a result, part of the light incident from the light source 14 incident into the light guide panel 12 from the incidence end surface portion 13 is totally reflected on the front surface portion 15 and/or the back surface portion 16 of the light guide panel 12 and is emanated from the light guide panel 12 to the outside thereof without being lost. For this, there is ensured a thin plane illuminator apparatus 11 with reduced light loss and power consumption.

The optical elements 22, 32, 33 protrude on the front surface portion 15 and/or the back surface portion 16 of the light guide panel 12 and are set at a ratio of the optical elements per unit area occupying the front surface portion 15 and/or the back surface portion 16 as they go away from the incidence end surface portion 13. The ratio is configured such that brightness distribution of the emanating light can be made uniform. The sizes of the optical elements 22, 32, 33 are set to be 10 to 150 $\mu$m. This configuration ensures a light guide panel 12 where the optical elements 22, 32, 33 are inconspicuous and there is eliminated the need of the joint use of an optical diffusion plate.

Further, there is ensured a light guide panel 12 having desired brightness distribution by controlling the occupation ratio of the optical elements 22, 32, 33.

Figure 22:
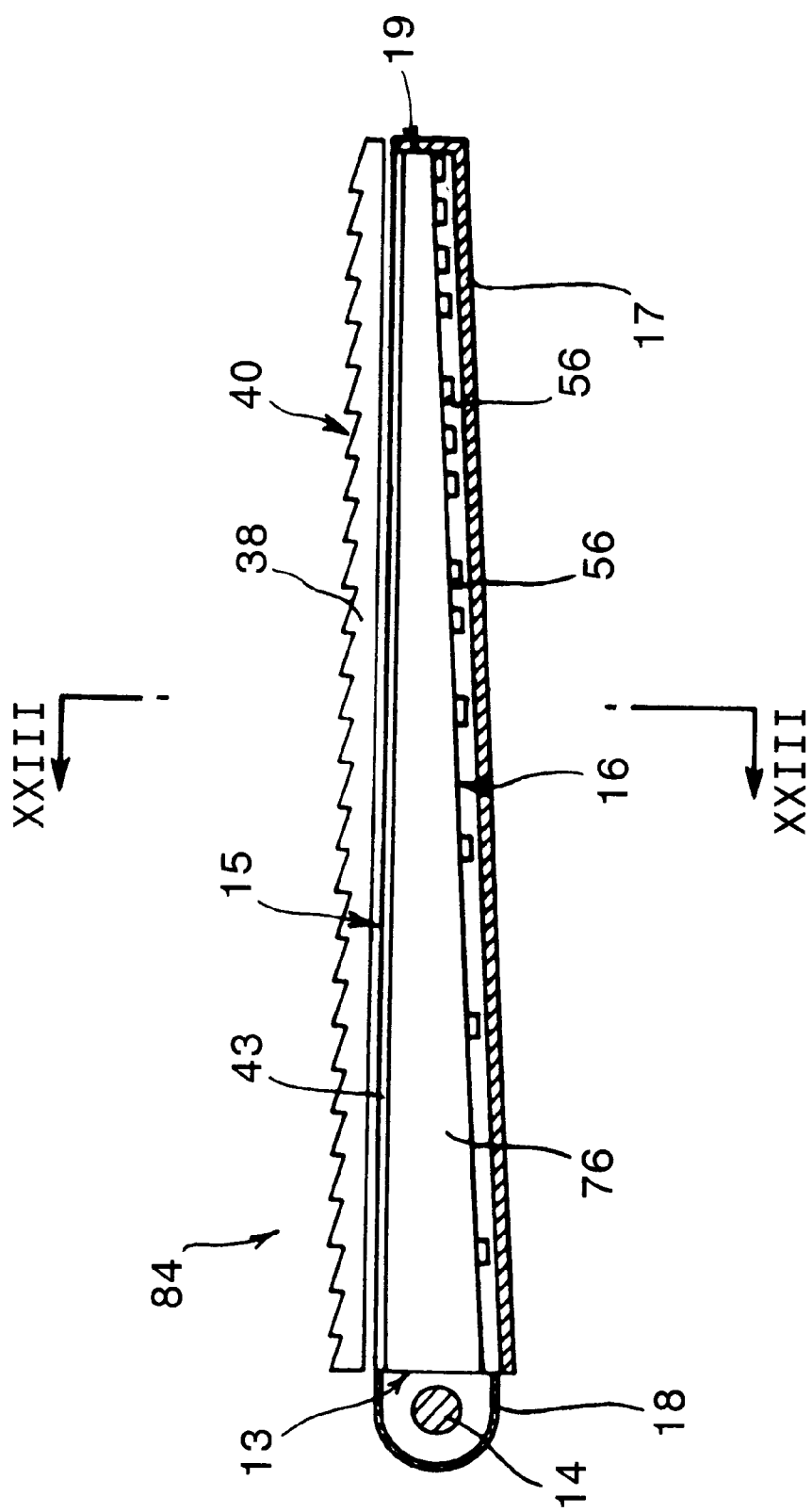
FIG. 22 is a cross section illustrating a schematic structure of yet another embodiment of the plane illuminator apparatus of the present invention.
Figure 23:
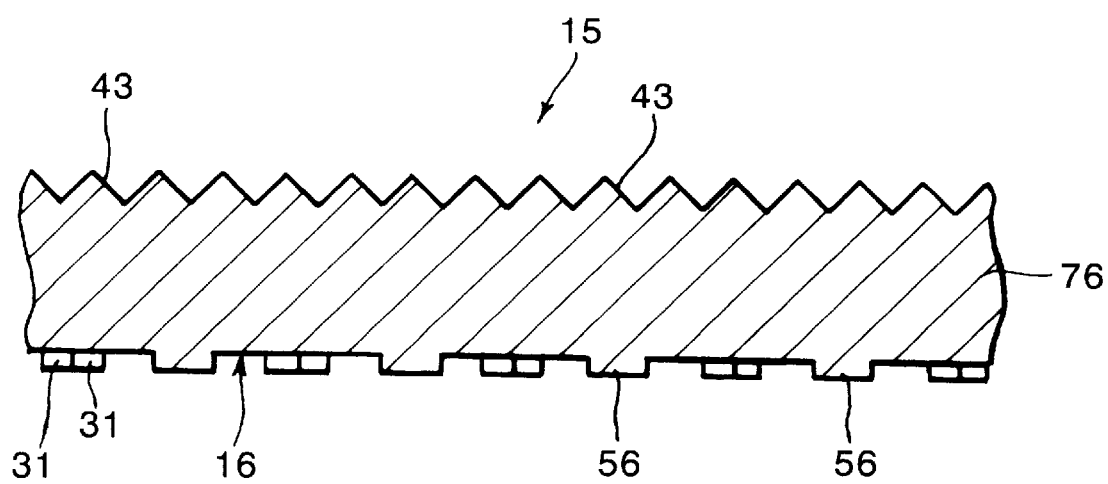
FIG. 23 is an enlarged cross section illustrating a light guide panel taken along an arrow XXIII—XXIII in FIG. 22.

FIG. 22 illustrates a cross sectional structure of another embodiment of the plane illuminator apparatus 84 according to the present invention. FIG. 23 illustrates a cross sectional structure taken along an arrow XXIII—XXIII. Identical symbols will be applied to like members having the same functions of those of the previous embodiment and overlapped descriptions will be omitted. On the back surface portion 16 of the light guide panel 76 in this embodiment there are disposed randomly the optical elements 56 each configured into an isosceles triangular prism including a vertical wall surface 30 (refer to FIG. 12.). Optical elements 56 have a triangular contour configuration projected perpendicularly to the back surface portion 16. The vertical wall surface 30 is directed to the side of the incidence end surface portion 13. A pair of vertical wall surfaces 31 are disposed symmetrically with respect to the vertical wall surface 30, and a triangular plane part 24 is disposed substantially parallel to the back surface portion 16. The optical element 56 is basically the same as that in the embodiment shown in FIG. 12.

The pair of the vertical wall surfaces 31 of these optical elements 56 have a light focusing/emanating function. Specifically, vertical wall surfaces 31 emanate light reflected from the side of the front surface portion 15 and incident on the optical elements 56 to the outside of the light guide panel 76, i.e., to the surface of the light reflection sheet 17 in a focused state. The vertical wall surface 30 and the plane part 24 of the optical element 56 serve to again impinge light emanating from the side of the back surface portion 16 of the light guide panel 76 and reflected in a scattered state from the light reflection sheet 17 into the optical element 56. The optical element 56 emanates part of the light propagating in the light guide panel 76 toward the light reflection sheet 17 in a focused state. The emanating light is strongly reflected on the light reflection sheet 17. As a result, the emanating light is introduced into the light guide panel 76 from the back surface portion 16 of the light guide panel 76, boundaries of the optical elements 22, and the plane part 24.

On the front surface portion 15 of the light guide panel 76 there is formed an isosceles triangular prismatic-shaped surface 43 which extends perpendicularly to the incidence end surface portion 13 (right direction in FIG. 22) and is arranged perpendicularly (left and right directions in FIG. 23) to the extension direction. The prismatic-shaped surface 43 in this embodiment adopts a vertical angle ranging from about 80 to 110 degrees. The same effect is ensured even when a convex spherical lens array with the predetermined radius of curvature is protruded on the front surface portion 15 of the light guide panel 76 instead of the prismatic-shaped surface 43.

A plurality of the optical elements 56 are formed on the front surface portion 15 and/or the back surface portion 16 of the light guide panel 76 for emanating the light to the outside in a focused state, as described above. The light from the light source 14 entering the light guide panel 76 from the incidence end surface portion 13 can be emanated to the outside of the light guide panel 76 with uniform brightness distribution without loss.

A ratio of the optical elements 56 per unit area occupying the front surface portion 15 and/or the back surface portion 16 of the light guide panel 76 is set to be larger as they go away from the incidence end surface portion 13. As a result, brightness distribution of the emanating light can be made uniform. The size of the optical element 56 is set to range from 10 to 150 $\mu$m. This ensures an excellent light guide panel 76 where the optical elements are inconspicuous and there is eliminated the need of the joint use of many light deflection sheets.

When the prismatic-shaped surface 43 is provided on the front surface portion 15 and/or the back surface portion 16 of the light guide panel 76 in a united manner, the conventional prism sheet can be further omitted. This ensures a thinner plane illuminator apparatus with reduced optical loss and power consumption.

Figure 24:
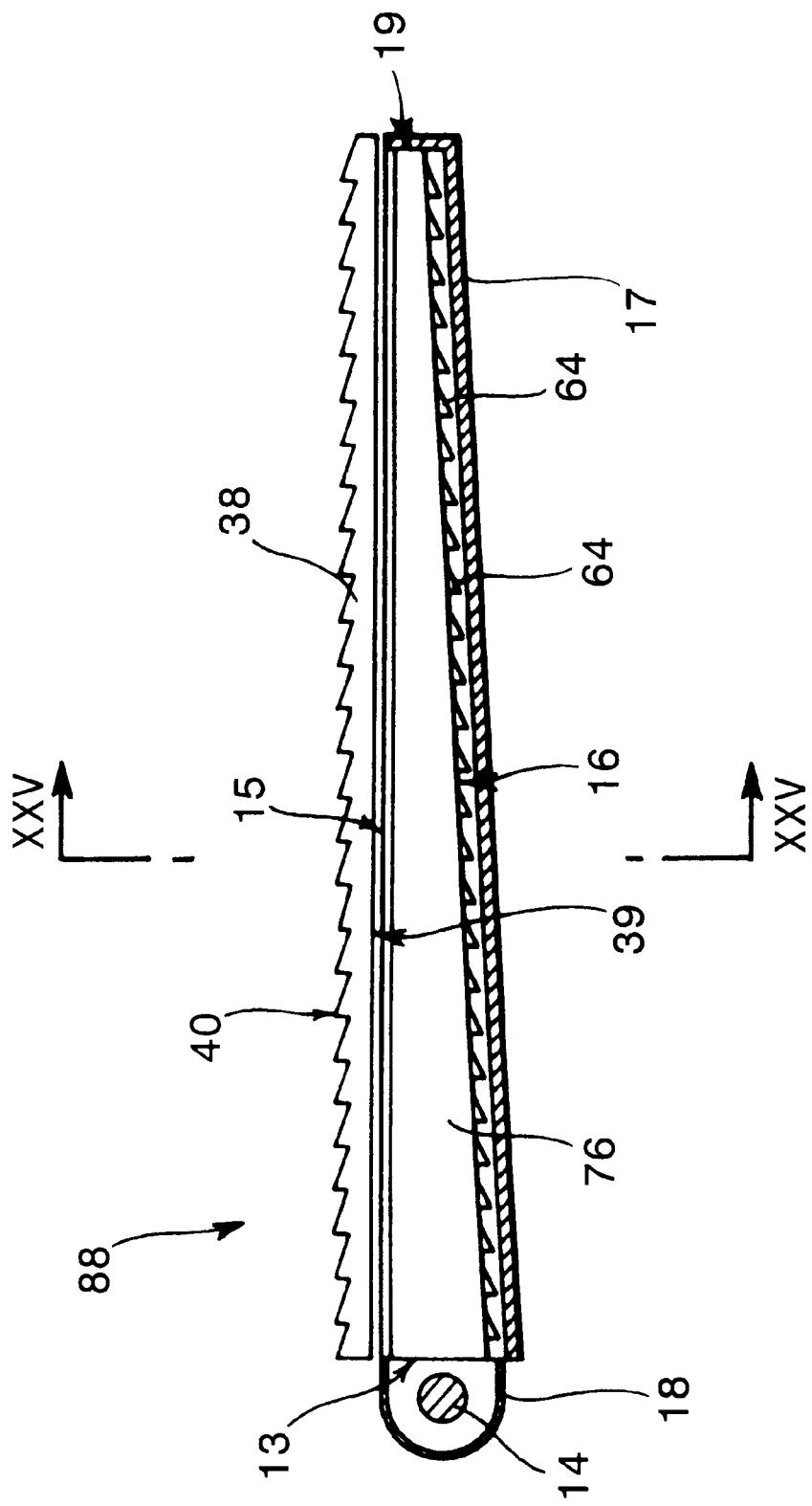
FIG. 24 is a cross section illustrating another embodiment of the plane illuminator apparatus of the present invention.
Figure 25:
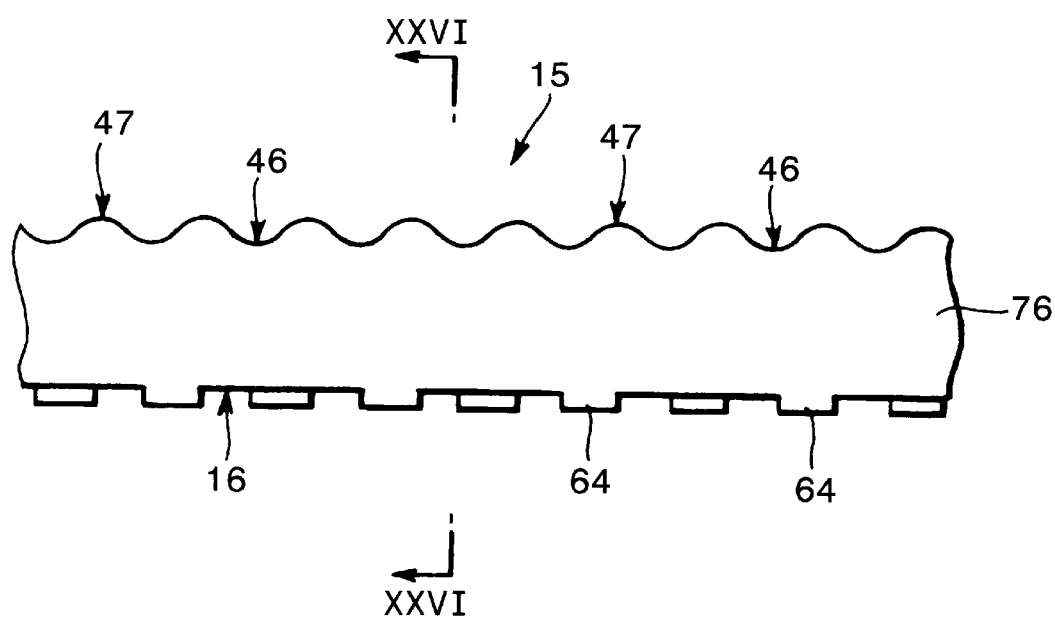
FIG. 25 is an enlarged cross section illustrating the light guide panel taken along an arrow XXV—XXV in FIG. 24.
Figure 26:
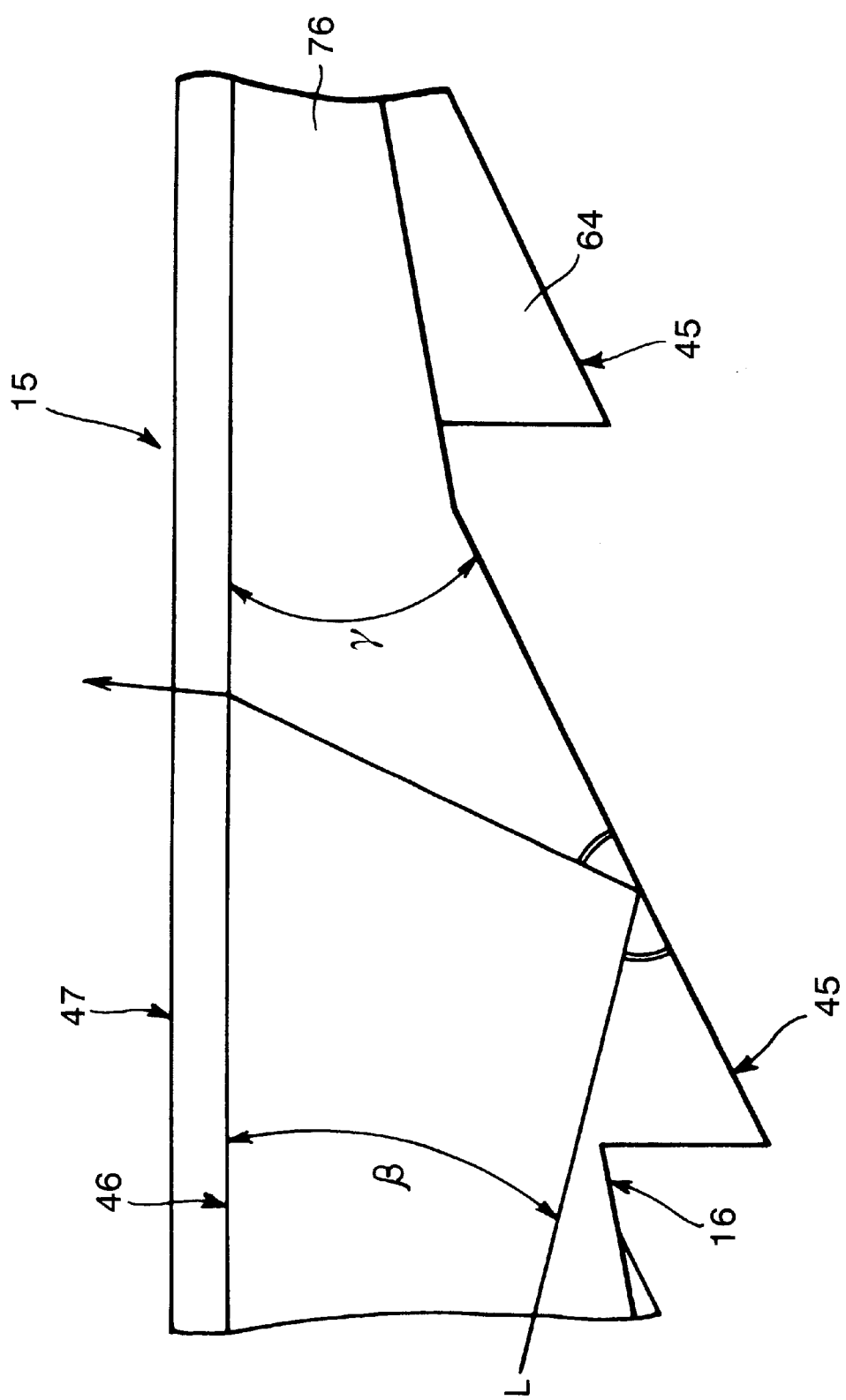
FIG. 26 is an enlarged cross section taken along an arrow XXVI—XXVI in FIG. 25.

FIG. 24 illustrates a cross sectional structure of another embodiment of the plane illuminator apparatus 88 according to the present invention. FIG. 25 illustrates an enlarged cross sectional structure of the light guide panel 76 taken along an arrow XXV—XXV. FIG. 26 illustrates an enlarged cross sectional structure taken along an arrow XXVI—XXVI. Identical symbols will be applied to like members with the same functions as those of the previous embodiment and overlapped descriptions will be omitted. The plane illuminator apparatus 88 in this embodiment includes a light guide panel 76, a light source 14, a light deflection plate 38, and a light reflection sheet 17.

On the back surface portion 16 of the light guide panel 76 there are distributed randomly rectangular optical elements 64 each configured into a triangular prism having an inclined surface 45 where an interval between it and the front surface portion 15 is increased as it goes toward the side of the incidence end surface portion 13. The optical element 64 is basically the same configuration as that in the embodiment shown in FIG. 13, but its direction is reversed by 180 degrees. Optical element 64 has a function for effectively totally reflecting the light entering from the incidence end surface portion 13 and propagating in the light guide panel 76 to guide it to the side of the front surface portion 15.

In order to totally reflect light L entering the light guide panel 76 at an incidence angle $\beta$, with respect to the front surface portion 15, on the inclination surface 45 having an inclination angle $\gamma$, with respect to the front surface portion 15, a relation $$\gamma \leq (\pi/2) - \beta - \beta_0,$$

is needed, where $\sin \beta_0 = 1/n$, n is a refractive index of the light guide panel 76 (n=1.49), $\beta_0$ is a critical angle of the light guide panel 76, and $\pi$ is the circular constant of a circle to its diameter. In the case of the light guide panel 76 using acrylic resin, as in this embodiment, the critical angle $\beta_0$ is about 42 degrees.

In order to emanate reflection light totally reflected on the back surface portion 16 to the outside from the front surface portion 15 of the light guide panel 76, a relation $$\gamma \geq \{(\pi/2) - \beta - \beta_0\}/2$$

must be satisfied. In order to effectively take out the light propagating in the light guide panel 76, the inclination angle $\gamma$ of the inclination surface 45 of the optical element 64 must satisfy a relation:

$$-\pi/36 \leq \gamma - (\pi/4) + (\beta/2) \leq \pi/18.$$

Figure 27:
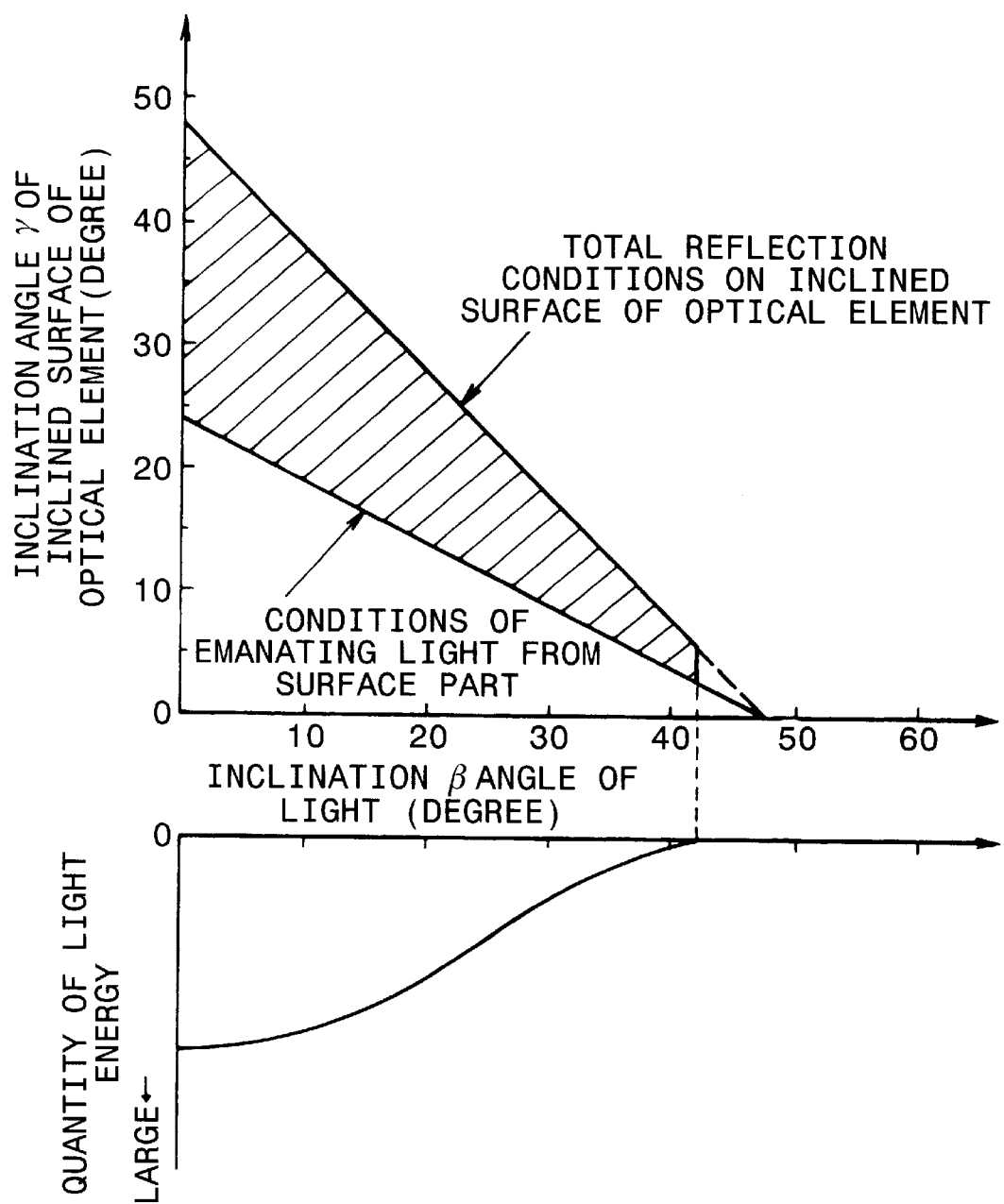
FIG. 27 is a graphical representation illustrating a relationship among an incidence angle β of light incident on an optical element, an inclination angle γ of an inclination surface of the optical element, and optical energy.

As illustrated in FIG. 27, energy of the reflection light emanating to the outside of the light guide panel 76 when the light reflection sheet 17 is not used becomes maximum when the incidence angle $\beta$ is 0 degree. The energy of reflection light gradually decreases as the incidence angle $\beta$ is increased, and becomes substantially 0 when above about 42 degrees. The reflection light is eliminated completely from the front surface portion 15 to the outside of the light guide panel 76 owing to existence of the light reflection sheet 17. Some loss may be due to boundary reflection and absorption at the inclination surface 45.

In order to totally reflect incident light $L_1$ on the inclination surface 45 of the optical element 64 and emanate reflected light $L_0$ to the outside of the light guide panel 76 from the front surface portion 15 without totally reflecting the reflected light $L_0$ on the front surface portion 15, it is necessary that the incidence angle $\beta$ and the inclination angle $\gamma$ are existent in the hatched region of FIG. 27. The inclination angle $\gamma$ satisfies such conditions in this embodiment where acrylic resin with the refractive index of 1.49 is used, when inclination angle $\gamma$ falls within a range of from about 24 to about 48 degrees and the incidence angle $\beta$ in this case falls within a range of from 0 to about 24 degrees.

The incident light with the incidence angle $\beta$ less than 24 degrees is completely totally reflected on the inclination surface 45 of the optical element 64 and is adapted to propagate to the side of the front surface portion 15. Most of the incident light $L_1$ with the incidence angle $\beta$ beyond 24 degrees emanates to the outside of the light guide panel 76 from the optical element 64. The incident light again enters the light guide panel 76 with the aid of the light reflection sheet 17, and finally emanates to the outside of the light guide panel 76 from the front surface portion 15. Part of the incident light with the incidence angle $\beta$ beyond 24 degrees is rendered to interfacial reflection on the inclination surface 45 of the optical element 64. The light is propagated to the side of the front surface portion 15 and is emanated to the outside of the light guide panel 76.

In the front surface portion 15 of the light guide panel 76 there are formed uneven corrugated surfaces 46, 47 with the predetermined radius of curvature extending perpendicularly to the incidence end surface portion 13 (right and left direction in FIG. 24) and arranged perpendicularly to the extension direction (right and left direction in FIG. 25). The concave surface 46 diffuses light emanating from the front surface portion 15 while the convex surface 47 converges the light emanating from the front surface portion 15 whereby uniform brightness distribution is ensured. Intervals between the adjacent concave surfaces 46 and between the convex surfaces 47 are desirably set to about 30 to 100 $\mu$m. A difference between heights of the concave surface 46 and the convex surface 47 is desirably about 10 to 45 $\mu$m.

In the aforementioned embodiment, although the corrugated uneven surfaces 46,47 with the predetermined radius of curvature are formed in the front surface portion 15 of the light guide panel 12, an isosceles triangle prismatic-shaped surface with the vertical angle of about 95 to 105 degrees may be continuously formed. Although there is adopted as the optical element 64 one configured into an isosceles triangle, it is also possible to adopt a configuration having a circular-arc surface with the predetermined radius of curvature.

Figure 28:
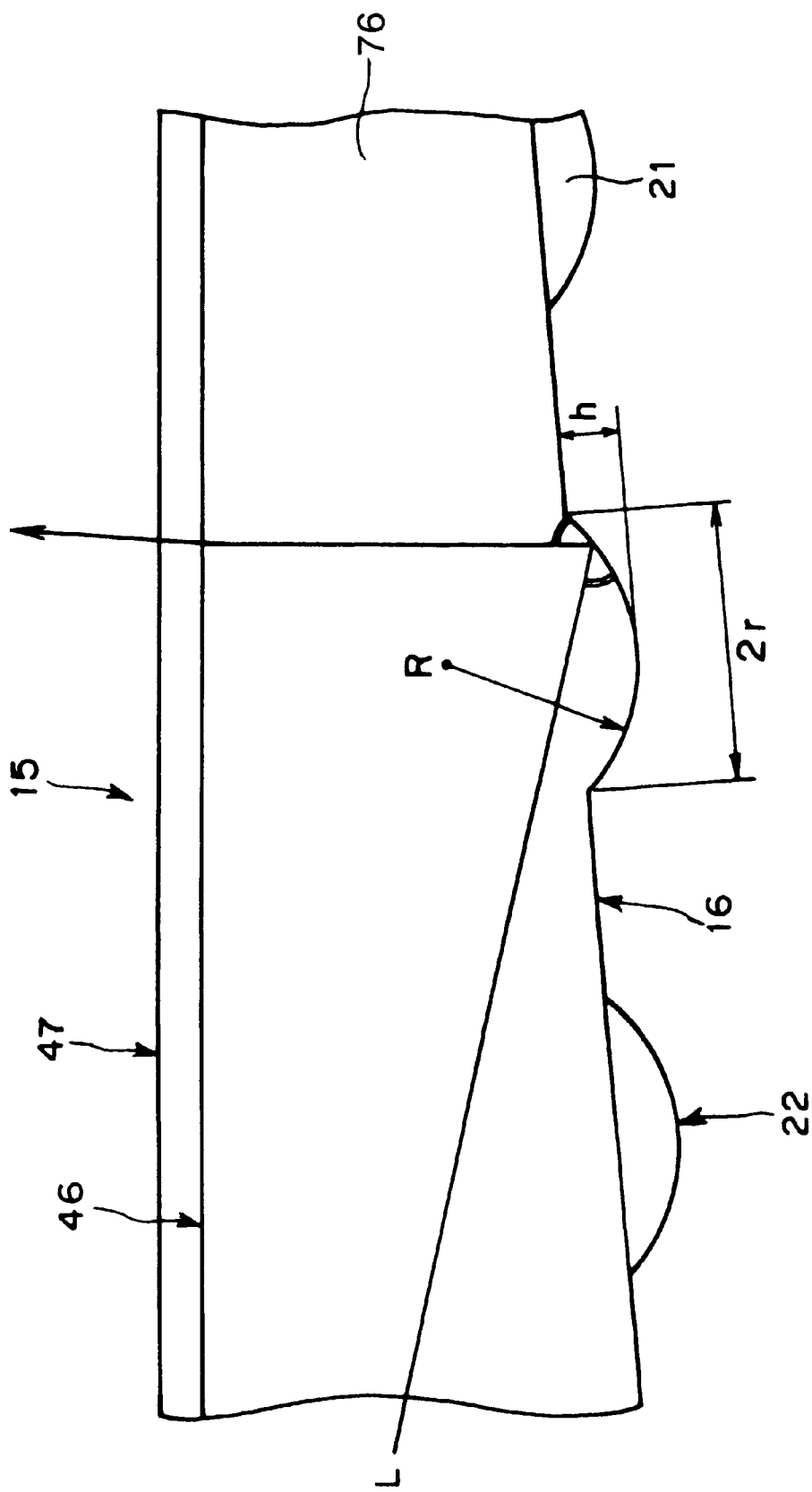
FIG. 28 is an extracted and enlarged cross section illustrating part of the light guide panel in another embodiment of the light guide panel of the present invention.

FIG. 28 illustrates a schematic structure of another embodiment of the light guide panel 76 according to the present invention. Identical symbols will be simply applied to like parts of the same functions as those of the previous embodiment, and overlapped descriptions will be omitted. On the back surface portion 16 of the light guide panel 76 there are disposed randomly the optical elements 22 each formed with a circular-arc surface 21 with the predetermined radius of curvature. Care is taken that a moire fringes pattern is prevented from being produced among the optical elements 22, the uneven surfaces 46, 47 formed in the front surface portion 15, and the light deflection plate 41. The present optical element 22 has basically the same configuration as that of the optical element 22 in the embodiment shown in FIG. 4.

A plurality of the optical elements 22 are formed on the front surface portion 15 and/or the back surface portion 16 of the light guide panel 76 for totally reflecting light incident from the incidence end surface portion 13 of the light guide panel 76. Part of the light form the light source 14 entering the light guide panel 76 from the incidence end surface portion 13 is totally reflected on the optical elements 22 protruded on the front surface portion 15 and/or the back surface portion 16 of the light guide panel 76 and is emanated to the outside of the light guide panel 76 without any loss.

The optical elements 22 protruded on the front surface portion 15 and/or the back surface portion 16 of the light guide panel 76 are set such that a ratio of the optical elements 22 per unit area occupying the front surface portion 15 and/or the back surface portion 16 is increased as they go away from the incidence end surface portion 13. As a result, brightness distribution of the emanating light can be made uniform. The size of the optical element 22 is set to be 10 to 150 $\mu$m. This ensures an excellent light guide panel 76 where the optical elements 22 are inconspicuous, and hence there is eliminated the need of the joint use of the light diffusion sheet.

Provided the light deflection means, such as the uneven surfaces 46, 47, is provided in the front surface portion 15 and/or the back surface portion 16 of the light guide panel 76 in a united manner, a conventionally used prism sheet can also be eliminated. This ensures a thin plane illuminator apparatus with reduced optical loss and power consumption.

Figure 29:
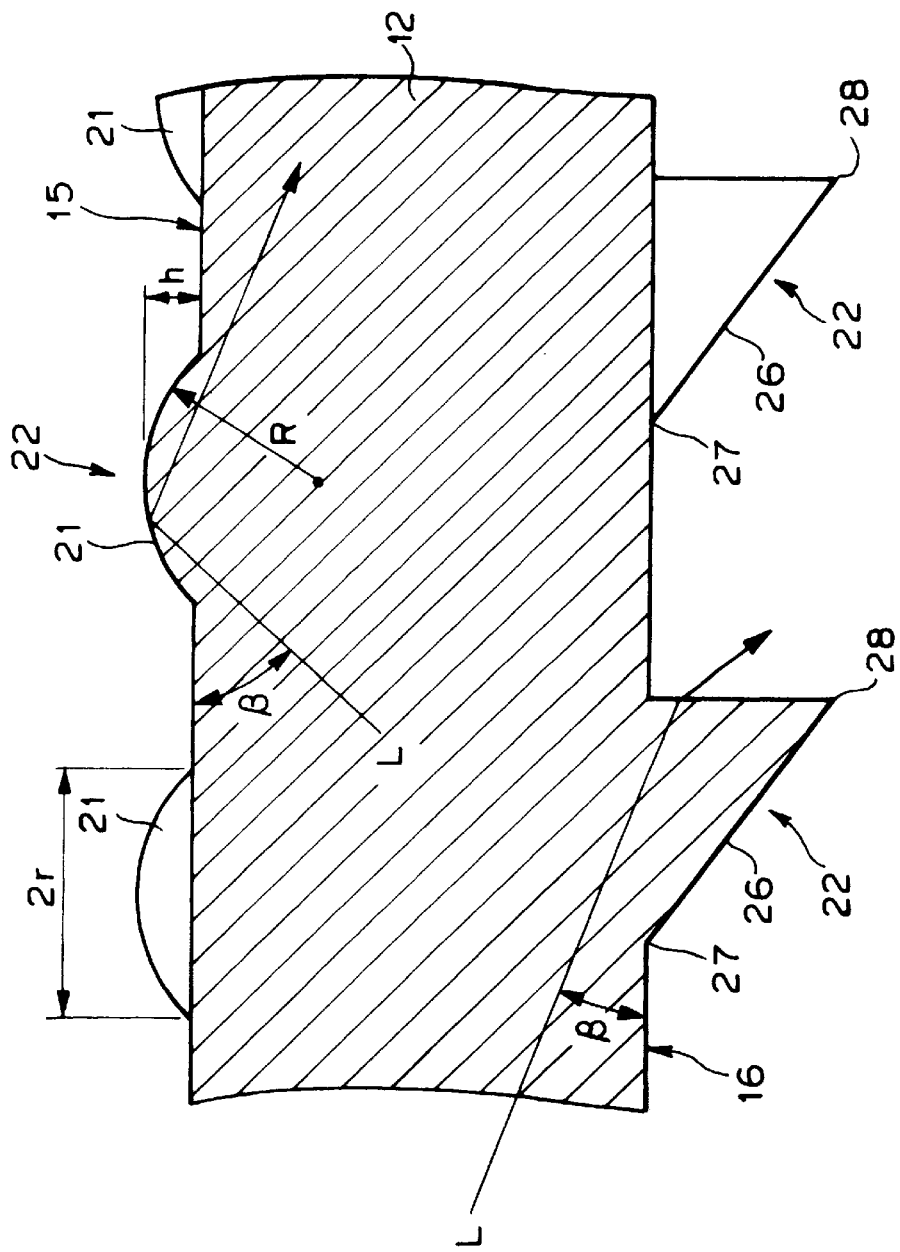
FIG. 29 is an extracted and enlarged cross section illustrating part of the light guide panel in further another embodiment of the light guide panel of the present invention.

The present invention has been described in detail with respect to preferred embodiments, and it will now be apparent from the foregoing to those skilled in the art that changes and modifications may be made without departing from the invention in its broader aspects. The invention, therefore, in the appended claims is intended to cover all such changes and modifications as fall within the true spirit of the invention. For example, the embodiment illustrated in FIG. 1 and the embodiment illustrated in FIG. 8 can be combined to also utilize them as a backlight source of a transmission type liquid crystal display. The optical elements 22 are formed respectively on the front surface portion 15 and the back surface portion 16 of the light guide panel 12 as illustrated in FIG. 29 to emanate most of the light L propagating in the light guide panel 12 from the side of the back surface portion 16. The light L illuminates the back surface portion 16 of the light guide panel 12 and the light reflection sheet (not shown) facing the back surface portion 16. Resulting diffusion and reflection light is again introduced into the light guide panel 12. This eliminates the need of the use of the aforementioned light deflection means and there is ensured low loss illumination light where a moire fringes pattern is prevented from happening.

Identical symbols will be applied to like members with the same functions as those in the previous embodiment in symbols in FIG. 29.

The present invention has been described in detail with respect to preferred embodiments, and it will now be apparent from the foregoing to those skilled in the art that changes and modifications may be made without departing from the invention in its broader aspect, and it is the intention, therefore, in the appended claims to cover all such changes and modifications as fall within the true sprit of the invention.

What is claimed is:

1. A light guide panel comprising:
   a front surface portion;
   a back surface portion located on a side opposite the front surface portion, the front surface portion and the back surface portion each extending between a first end and an opposing second end;
   an incidence end surface portion located at the first end of the front and back surface portions, the light guide panel being configured to emanate light incident from the incidence end surface portion through at least one of the front and back surface portions; and
   a plurality of optical elements outwardly projecting on at least one of the front and back surface portions in random positioning, each optical element having a plurality of exposed planar sides.

2. A light guide panel as claimed in claim 1 wherein the each optical element consists of four exposed planar sides.

3. A light guide panel as claimed in claim 1 wherein the each optical element consists of five exposed planar sides.

4. A light guide panel as claimed in claim 1 wherein at least one of the exposed planar sides of each optical element is inclined relative to the at least one front and back surface portion.

5. A light guide panel as claimed in claim 1 wherein each optical element comprises at least four planar sides, at least two of the planar sides being inclined relative to the at least one front and back surface portion.

6. A light guide panel as claimed in claim 1 wherein at least one of the exposed planar sides has a triangular configuration.

7. A light guide panel as claimed in claim 1, wherein the front surface portion and the back surface portion are disposed in intersection planes.

8. A light guide panel as claimed in claim 1, wherein the ratio of optical elements on the at least one front and back surface portion per unit area continually increases from the first end of the front and back surface portions to the second end of the front and back surface portions.

9. A light guide panel including a front surface portion, a back surface portion located on the opposite side of said front surface portion, and an incidence end surface portion located on one end sides of the front and back surface portions, said light guide panel serving to emanate light incident from said incidence end surface portion from at least one of said front and back surface portions,
   a plurality of optical elements for emanating light propagating in said light guide panel are provided on at least one of said front and back surface portions randomly, said optical elements having an inclined plane in which an interval between said inclined plane and said front surface portion and/or said back surface portion on which said optical elements are provided, is increased along the length of the inclined plane.

10. A light guide panel as claimed in claim 9 wherein the maximum diameter of said optical element ranges from 10 $\mu$m to 150 $\mu$m.

11. A light guide panel as claimed in claim 9 wherein an angle $\gamma$ formed between said inclined plane and said front surface portion and/or said back surface portion satisfies:

$$\{(2\pi/9)-(\beta/2)\} \leq \gamma \leq \{(11\pi/36)-(\beta/2)\},$$

where $\beta=\sin^{-1}(1/n)$, n is the refractive index of material constructing said light guide panel, and $\pi$ is the circular constant of a circle to its diameter.

12. A light guide panel as claimed in claim 9 wherein said optical element includes part of a convex spherical surface having a arc surface of a predetermined radius of curvature in a plane perpendicular to said front surface portion and/or said back surface portion, on which said optical element is provided, and said incidence end surface portion.

13. A light guide panel as claimed in claim 9 wherein the refractive index of a material constructing said light guide panel is represented by n, $\pi$ is the circular constant of a circle to its diameter, and r is the radius of said optical element, a relationship between the radius R of curvature of said arc surface and the amount h of protrusion of said arc surface from said front surface portion and/or said back surface portion where said optical element is provided satisfies:

$$h=R(1-\cos \epsilon)$$

and $$\{(2\pi/9)-(\beta/2)\} \leq \epsilon \leq \{(11\pi/36)-(\beta/2)\},$$

where $\beta=\sin^{-1}(1/n)$ and R=r/sin $\pi$.

14. A light guide panel as claimed in claim 9 wherein the inclined plane outwardly slopes toward to the incidence end surface portion.

15. A light guide panel as claimed in claim 9 wherein the inclined plane outwardly slopes away from the incidence end surface portion.

16. A light guide panel as claimed in claim 9 wherein said optical element is adapted such that contours configuration projected perpendicularly onto said front surface portion and/or said back surface portion on which said optical element is provided is a triangle having one side set substantially in parallel to said incidence end surface portion.

17. A light guide panel as claimed in claim 16 wherein said optical element is a triangular pyramid including a pyramid surface inclined with respect to said front surface portion and/or said back surface portion on which said optical element is provided and having said one side, and including a pair of pyramid surfaces substantially perpendicular to said front surface portion and/or said back surface portion on which said optical element is provided.

18. A light guide panel as claimed in claim 16 wherein said optical element is configured into a triangular pillar.

19. A light guide panel as claimed in claim 9 wherein said optical element is provided only on any one of said front and back surface portions, and light deflection means is provided on the other of said front and back surface portions for deflecting the light in a predetermined direction.

20. A light guide panel as claimed in claim 19 wherein said light deflection means has convex and concave surfaces extending perpendicularly to said incidence end surface portion and having a predetermined radius of curvature alternately arranged perpendicularly to the extension direction of said convex and concave surfaces.

21. A light guide panel as claimed in claim 20 wherein said light deflection means includes a plurality of triangular pillar-like shaped prism surfaces extending perpendicularly to said incidence end surface portion and arranging perpendicularly to the extension direction of said convex and concave surfaces.

22. A light guide panel including a front surface portion, a back surface portion located on the opposite side of said front surface portion, and an incidence end surface portion located on one end sides of these front and back surface portions, said light guide panel being disposed between an observation position and an object to be observed, characterized in that a plurality of optical elements for emanating light propagating in said light guide panel from said back surface portion are provided on at least one of said front and back surface portions randomly, and the total area of these optical elements is set within a range of from 1 to 20% of an area of said front surface portion or said back surface portion.

23. A light guide panel as claimed in claim 22 wherein the size of said optical element ranges from 10 μm to 150 μm.

24. A light guide panel as claimed in claim 22 wherein said optical element is adapted such that contours configuration projected perpendicularly to said front surface portion and/or said back surface portion on which said optical element is provided a triangle with its one side being set substantially parallel to said incidence end surface portion.

25. A light guide panel as claimed in claim 24 wherein the configuration of said optical element is triangular pyramid-shaped which has a pyramid surface inclined to said front surface portion and/or said back surface portion on which said optical element is provided and having said side, and has a pair of pyramid surfaces substantially perpendicular to said front surface portion and/or said back surface portion.

26. A light guide panel as claimed in claim 22 wherein said optical element includes part of a convex spherical surface having a arc surface with the predetermined radius of curvature in a plane perpendicular to said front surface portion and/or said back surface portion on which said optical element is provided, and said incidence end surface portion.

27. A light guide panel as claimed in claim 26 wherein when the refractive index of a material constructing said light guide panel is represented by n, π is the circular constant of a circle to its diameter, and r is the radius of said optical element, a relationship between the radius R of curvature of said arc surface and the amount h of protrusion of said arc surface from said front surface portion and/or said back surface portion where said optical element is provided satisfies:

$$h = R(1 - \cos \epsilon)$$

and $$\{(2\pi/9) - (\beta/2)\} \leq \epsilon \leq \{(11\pi/36) - (\beta/2)\},$$

where $\beta = \sin^{-1}(1/n)$ and $R = r/\sin \epsilon$.

28. A plane illuminator apparatus characterized in that it includes:

a light guide panel including a front surface portion, a back surface portion located on the opposite side of said front surface portion, and an incidence end surface portion located on one end sides of these front and back surface portions;

a light source for projecting light into said light guide panel from said incidence end surface portion of said light guide panel;

a light reflection sheet for covering said light guide panel excepting said front surface portion and said incidence end surface portion of the same; and a plurality of optical elements which are provided randomly on at least one of said front and back surface portions for emanating light propagating in said light guide panel from at least one of said front and back surface portions to the outside of said light guide panel, the ratio of optical elements on the at least one front and back surface portion per unit area continually increasing from the incidence end surface portion to the opposing end of the front and back surface portions.

29. A plane illuminator apparatus as claimed in claim 28 wherein said optical element is provided only on any one of said front and back surface portions, and that light deflection means is provided on the other of said front and back surface portions for deflecting the light in a predetermined direction.

30. A light guide panel comprising:

a front surface portion;

a back surface portion located on a side opposite the front surface portion;

an incidence end surface portion located at an end of the front and back surface portions, the light guide panel being configured to emanate light incident from the incidence end surface portion through at least one of the front and back surface portions; and a plurality of optical elements provided on at least one of the front and back surface portions, at least a portion of each optical element having a triangular shape with one side thereof being set substantially in parallel to the incidence end surface portion.

31. A light guide panel as claimed in claim 30 wherein the optical elements are randomly disposed on the at least one of the front and back surface portions.

32. A light guide panel comprising:

a front surface portion;

a back surface portion located on a side opposite the front surface portion;

an incidence end surface portion located at an end of the front and back surface portions, the light guide panel being configured to emanate light incident from the incidence end surface portion through at least one of the front and back surface portions; and a plurality of optical elements randomly provided on a select one of the front and back surface portions; and light deflection means provided on the other of said front and back surface portions for deflecting the light in a predetermined direction, the light deflection means including convex and concave surfaces extending perpendicularly to said incidence end surface portion and having a predetermined radius of curvature alternately arranged perpendicularly to the extension direction of said convex and concave surfaces, the light deflection means also including a plurality of triangular pillar-like shaped prism surfaces extending perpendicularly to said incidence end surface portion and arranging perpendicularly to the extension direction of said convex and concave surfaces.

* * * * *

UNITED STATES PATENT AND TRADEMARK OFFICE
CERTIFICATE OF CORRECTION

PATENT NO. : 6,174,064 B1
APPLICATION NO. : 09/189303
DATED : January 16, 2001
INVENTOR(S) : Kalil Kalantar, Shingo Matsumoto and Tomohisa Onishi It is certified that error appears in the above-identified patent and that said Letters Patent is hereby corrected as shown below:

Title Page: Delete item [54] title "LIGHT GUIDE PANEL AND PLANE ILLUMINATOR APPARATUS" Insert --LIGHT GUIDE PANEL WITH OPTICAL ELEMENTS FORMED THEREIN FOR IMPROVED ILLUMINATION AND ILLUMINATOR APPARATUS USING SUCH PANEL--

Cover Page under item [57] ABSTRACT, ln. 7: after "optical elements" change "are" to --is--

Col. 1 ln. 13: after "illuminator apparatus," change "and more specifically" to --and, more specifically,--

Col. 2 ln. 1: after "diffused," insert --and--

Col. 2 ln. 10: after "The" change "Conventional" to --conventional--

Col. 2 ln. 15: after "Thus," change "the Conventional" to --the conventional--

Col. 2 ln. 19: after "The" change "Conventional" to --conventional--

Col. 2 ln. 33: after "outdoor daylight" change "and hence" to --and, hence,--

Col. 2 ln. 55: after "It" change "is therefore" to --is, therefore,--

Col. 2 ln. 61: after "liquid crystal panel" change "and hence" to --and, hence--

Col. 3 ln. 3: after "reduced" insert --,--

Col. 3 ln. 6: after "invention" insert --,--

Col. 3 ln. 9: after "end" delete [sides]

Col. 3 ln. 28: after "light guide panel" insert --,--

Col. 3 ln. 41: after "light guide panel," insert --and--

Col. 3 ln. 44: after "having" change "a" to --an--

Col. 3 ln. 65: after "substantially" delete [in]

Col. 4 ln. 24: after "end" delete [sides]

UNITED STATES PATENT AND TRADEMARK OFFICE
CERTIFICATE OF CORRECTION

PATENT NO. : 6,174,064 B1
APPLICATION NO. : 09/189303
DATED : January 16, 2001
INVENTOR(S) : Kalil Kalantar, Shingo Matsumoto and Tomohisa Onishi It is certified that error appears in the above-identified patent and that said Letters Patent is hereby corrected as shown below:

Col. 4 ln. 37: after "with total" change "reflect" to --reflection--

Col. 4 ln. 46: after "light guide panel" insert --,--

Col. 4 ln. 50: after "having" change "a" to --an--

Col. 4 ln. 59: change "surface and" to --surface, and--

Col. 5 ln. 17: after "one end" delete [sides]

Col. 5 ln. 23: after "optical elements" change "are" to --is--

Col. 5 ln. 40: after "plane illuminator apparatus" insert --,--

Col. 7 ln. 37: after "light guide panel in" change "further" to --yet--

Col. 7 ln. 53: after "The" change "Figures" to --figures--

Col. 8 ln. 19: after "(PMMA)" insert --,--

Col. 8 ln. 19: before "polycarbonate" delete [and]

Col. 8 ln. 20: after "(PC)" insert --,--

Col. 8 ln. 66: after "," insert --and--

Col. 9 ln. 60: after "where" change "x, y" to --x and y--

Col. 10 ln. 3: after "reduced" change "and hence" to --and, hence,--

Col. 10 ln. 54: after "guide panel" change "12 a" to --12. A--

Col. 11 ln. 7: after "s and h" insert --,--

Col. 11 ln. 17: after "Thus" insert --,--

Col. 11 ln. 35: after "relation" change ";" to --:--

Col. 12 ln. 58: after "present invention" insert --,--

UNITED STATES PATENT AND TRADEMARK OFFICE
CERTIFICATE OF CORRECTION

PATENT NO.        : 6,174,064 B1
APPLICATION NO. : 09/189303
DATED               : January 16, 2001
INVENTOR(S)      : Kalil Kalantar, Shingo Matsumoto and Tomohisa Onishi It is certified that error appears in the above-identified patent and that said Letters Patent is hereby corrected as shown below:

Col. 12 ln. 67: after "FIG. 8" delete [.]

Col. 13 ln. 13: after "FIG. 8" delete [.]

Col. 13 ln. 32: after "FIG. 1" delete [.]

Col. 14 ln. 51: after "portions 20," delete [and]

Col. 14 ln. 51: after "16," insert --and--

Col. 14 ln. 59: after "panel 76" insert --,--

Col. 15 ln. 6: after "same" delete [27]

Col. 15 ln. 48: after "It" change "is therefore" to --is, therefore,--

Col. 15 ln. 54: after "it" change "is of course" to --is, of course,--

Col. 16 ln. 13: after "In this case" insert --,--

Col. 16 ln. 22: after "there" change "are" to --is--

Col. 16 ln. 23: after "33" insert --,--

Col. 16 ln. 33: after "the need" change "of" to --for--

Col. 16 ln. 39: after "panel 12" insert --,--

Col. 16 ln. 44: before "of emanating" change "Direction" to --The direction--

Col. 16 ln. 66: after "FIG. 15" delete [.]

Col. 17 ln. 3: after "disposed" delete [,]

Col. 17 ln. 3: change "separated" to --separate--

Col. 17 ln. 5: after "embodiment" insert --,--

Col. 17 ln. 47: after "embodiment" insert --,--

UNITED STATES PATENT AND TRADEMARK OFFICE
CERTIFICATE OF CORRECTION

PATENT NO. : 6,174,064 B1
APPLICATION NO. : 09/189303
DATED : January 16, 2001
INVENTOR(S) : Kalil Kalantar, Shingo Matsumoto and Tomohisa Onishi It is certified that error appears in the above-identified patent and that said Letters Patent is hereby corrected as shown below:

Col. 17 ln. 50: after "12" delete [.]

Col. 18 ln. 11: after "panel 76" insert --,--

Col. 18 ln. 59: after "panel 76" insert --,--

Col. 20 ln. 27: after "panel 76" insert --,--

Col. 20 ln. 37: after "optical elements 22" change "are" to --is--

Col. 20 ln. 41: after "Part of the light" change "form" to --from--

Col. 21 ln. 5: after "modifications" change "as" to --that--

Col. 22 ln. 32 claim 11: after "having" change "a" to --an--

Col. 22 ln. 63 claim 16: before "parallel" delete [in]

Col. 23 ln. 28 claim 22: after "one end" delete [sides]

Col. 23 ln. 34 claim 22: after "surface portion" change "are" to --is--

Col. 23 ln. 56 claim 26: after "having" change "a" to --an--

Col. 24 ln. 14 claim 28: after "one end" delete [sides]

Signed and Sealed this

Fifth Day of August, 2008

JON W. DUDAS
*Director of the United States Patent and Trademark Office*

UNITED STATES PATENT AND TRADEMARK OFFICE
CERTIFICATE OF CORRECTION

PATENT NO.       : 6,174,064 B1
APPLICATION NO.  : 09/189303
DATED            : January 16, 2001
INVENTOR(S)      : Kalil Kalantar, Shingo Matsumoto and Tomohisa Onishi It is certified that error appears in the above-identified patent and that said Letters Patent is hereby corrected as shown below:

Title Page: Delete item [54] and Column 1, lines 1 and 2 title "LIGHT GUIDE PANEL AND PLANE ILLUMINATOR APPARATUS" Insert --LIGHT GUIDE PANEL WITH OPTICAL ELEMENTS FORMED THEREIN FOR IMPROVED ILLUMINATION AND ILLUMINATOR APPARATUS USING SUCH PANEL--

Cover Page under item [57] ABSTRACT, ln. 7: after "optical elements" change "are" to --is--

Col. 1 ln. 13: after "illuminator apparatus," change "and more specifically" to --and, more specifically,--

Col. 2 ln. 1: after "diffused," insert --and--

Col. 2 ln. 10: after "The" change "Conventional" to --conventional--

Col. 2 ln. 15: after "Thus," change "the Conventional" to --the conventional--

Col. 2 ln. 19: after "The" change "Conventional" to --conventional--

Col. 2 ln. 33: after "outdoor daylight" change "and hence" to --and, hence,--

Col. 2 ln. 55: after "It" change "is therefore" to --is, therefore,--

Col. 2 ln. 61: after "liquid crystal panel" change "and hence" to --and, hence--

Col. 3 ln. 3: after "reduced" insert --,--

Col. 3 ln. 6: after "invention" insert --,--

Col. 3 ln. 9: after "end" delete "sides"

Col. 3 ln. 28: after "light guide panel" insert --,--

Col. 3 ln. 41: after "light guide panel," insert --and--

Col. 3 ln. 44: after "having" change "a" to --an--

Col. 3 ln. 65: after "substantially" delete "in"

Col. 4 ln. 24: after "end" delete "sides"

UNITED STATES PATENT AND TRADEMARK OFFICE
CERTIFICATE OF CORRECTION

PATENT NO.        : 6,174,064 B1
APPLICATION NO. : 09/189303
DATED              : January 16, 2001
INVENTOR(S)      : Kalil Kalantar, Shingo Matsumoto and Tomohisa Onishi It is certified that error appears in the above-identified patent and that said Letters Patent is hereby corrected as shown below:

Col. 4 ln. 37: after "with total" change "reflect" to --reflection--

Col. 4 ln. 46: after "light guide panel" insert --,--

Col. 4 ln. 50: after "having" change "a" to --an--

Col. 4 ln. 59: change "surface and" to --surface, and--

Col. 5 ln. 17: after "one end" delete "sides"

Col. 5 ln. 23: after "optical elements" change "are" to --is--

Col. 5 ln. 40: after "plane illuminator apparatus" insert --,--

Col. 7 ln. 37: after "light guide panel in" change "further" to --yet--

Col. 7 ln. 53: after "The" change "Figures" to --figures--

Col. 8 ln. 19: after "(PMMA)" insert --,--

Col. 8 ln. 19: before "polycarbonate" delete "and"

Col. 8 ln. 20: after "(PC)" insert --,--

Col. 8 ln. 66: after "," insert --and--

Col. 9 ln. 60: after "where" change "x, y" to --x and y--

Col. 10 ln. 3: after "reduced" change "and hence" to --and, hence,--

Col. 10 ln. 54: after "guide panel" change "12 a" to --12. A--

Col. 11 ln. 7: after "s and h" insert --,--

Col. 11 ln. 17: after "Thus" insert --,--

Col. 11 ln. 35: after "relation" change ";" to --:--

Col. 12 ln. 58: after "present invention" insert --,--

UNITED STATES PATENT AND TRADEMARK OFFICE
CERTIFICATE OF CORRECTION

PATENT NO. : 6,174,064 B1
APPLICATION NO. : 09/189303
DATED : January 16, 2001
INVENTOR(S) : Kalil Kalantar, Shingo Matsumoto and Tomohisa Onishi It is certified that error appears in the above-identified patent and that said Letters Patent is hereby corrected as shown below:

Col. 12 ln. 67: after "FIG. 8" delete "."

Col. 13 ln. 13: after "FIG. 8" delete "."

Col. 13 ln. 32: after "FIG. 1" delete "."

Col. 14 ln. 51: after "portions 20," delete "and"

Col. 14 ln. 51: after "16," insert --and--

Col. 14 ln. 59: after "panel 76" insert --,--

Col. 15 ln. 6: after "same" delete "27"

Col. 15 ln. 48: after "It" change "is therefore" to --is, therefore,--

Col. 15 ln. 54: after "it" change "is of course" to --is, of course,--

Col. 16 ln. 13: after "In this case" insert --,--

Col. 16 ln. 22: after "there" change "are" to --is--

Col. 16 ln. 23: after "33" insert --,--

Col. 16 ln. 33: after "the need" change "of" to --for--

Col. 16 ln. 39: after "panel 12" insert --,--

Col. 16 ln. 44: before "of emanating" change "Direction" to --The direction--

Col. 16 ln. 66: after "FIG. 15" delete "."

Col. 17 ln. 3: after "disposed" delete ","

Col. 17 ln. 3: change "separated" to --separate--

Col. 17 ln. 5: after "embodiment" insert --,--

Col. 17 ln. 47: after "embodiment" insert --,--

UNITED STATES PATENT AND TRADEMARK OFFICE
CERTIFICATE OF CORRECTION

| | | |
|---|---|---|
| PATENT NO. | : 6,174,064 B1 | |
| APPLICATION NO. | : 09/189303 | |
| DATED | : January 16, 2001 | |
| INVENTOR(S) | : Kalil Kalantar, Shingo Matsumoto and Tomohisa Onishi | |

It is certified that error appears in the above-identified patent and that said Letters Patent is hereby corrected as shown below:

Col. 17 ln. 50: after "12" delete "."

Col. 18 ln. 11: after "panel 76" insert --,--

Col. 18 ln. 59: after "panel 76" insert --,--

Col. 20 ln. 27: after "panel 76" insert --,--

Col. 20 ln. 37: after "optical elements 22" change "are" to --is--

Col. 20 ln. 41: after "Part of the light" change "form" to --from--

Col. 21 ln. 5: after "modifications" change "as" to --that--

Col. 22 ln. 32 claim 11: after "having" change "a" to --an--

Col. 22 ln. 63 claim 16: before "parallel" delete "in"

Col. 23 ln. 28 claim 22: after "one end" delete "sides"

Col. 23 ln. 34 claim 22: after "surface portion" change "are" to --is--

UNITED STATES PATENT AND TRADEMARK OFFICE
CERTIFICATE OF CORRECTION

PATENT NO. : 6,174,064 B1
APPLICATION NO. : 09/189303
DATED : January 16, 2001
INVENTOR(S) : Kalil Kalantar, Shingo Matsumoto and Tomohisa Onishi It is certified that error appears in the above-identified patent and that said Letters Patent is hereby corrected as shown below:

Col. 23 ln. 56 claim 26: after "having" change "a" to --an--

Col. 24 ln. 14 claim 28: after "one end" delete "sides"

This certificate supersedes the Certificate of Correction issued August 5, 2008.

Signed and Sealed this

Fourteenth Day of October, 2008

JON W. DUDAS
*Director of the United States Patent and Trademark Office*